(12) United States Patent
Hasegawa et al.

(10) Patent No.: US 9,852,760 B2
(45) Date of Patent: Dec. 26, 2017

(54) IMAGE RECORDING APPARATUS, CONTROL METHOD OF THE SAME, AND RECORDING MEDIUM

(71) Applicant: CANON KABUSHIKI KAISHA, Tokyo (JP)

(72) Inventors: Hiroyuki Hasegawa, Nagareyama (JP); Tomohiro Sekiguchi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/230,180

(22) Filed: Aug. 5, 2016

(65) Prior Publication Data

US 2017/0048477 A1 Feb. 16, 2017

(30) Foreign Application Priority Data

Aug. 10, 2015 (JP) .................................. 2015-158532
Aug. 24, 2015 (JP) .................................. 2015-164980

(51) Int. Cl.
*H04N 5/77* (2006.01)
*H04N 9/80* (2006.01)
*G11B 27/00* (2006.01)
*H04N 5/76* (2006.01)

(52) U.S. Cl.
CPC ......... *G11B 27/005* (2013.01); *H04N 5/7605* (2013.01); *H04N 5/77* (2013.01)

(58) Field of Classification Search
CPC .... G11B 27/005; G11B 31/00; H04N 5/7605; H04N 5/772

USPC ................ 386/224, 248, 291, 239, 323, 326
See application file for complete search history.

(56) References Cited

U.S. PATENT DOCUMENTS

2011/0116759 A1\* 5/2011 Oikawa .................. H04N 5/232
386/226

FOREIGN PATENT DOCUMENTS

JP 2005-328154 A 11/2005
JP 2009-225116 A 10/2009

\* cited by examiner

*Primary Examiner* — Robert Chevalier
(74) *Attorney, Agent, or Firm* — Canon U.S.A., Inc. IP Division

(57) ABSTRACT

An image recording apparatus that can communicate with an external apparatus includes a recording unit, a completion unit, a first input unit, and a transmission unit. The recording unit records movie data on at least one recording medium. The completion unit completes a movie file based on recorded movie data. The first input unit receives a predetermined instruction for transmitting at least part of movie data, recorded by the recording unit, to the external apparatus. The transmission unit transmits, via the communication interface, at least one of movie files completed by the completion unit, based on the predetermined instruction. Where the first input unit receives the predetermined instruction while the recording unit is recording the movie data, the completion unit completes a recorded part of the movie data being recorded, as a movie file, and the transmission unit automatically transmits the completed movie file via the communication interface.

20 Claims, 27 Drawing Sheets

FIG. 5A

| SCENE NUMBER [0] | FILE NUMBER [0][0] | FILE NUMBER [0][1] | FILE NUMBER [0][...] |
| SCENE NUMBER [1] | FILE NUMBER [1][0] | FILE NUMBER [1][1] | FILE NUMBER [1][...] |
| SCENE NUMBER [2] | FILE NUMBER [2][0] | FILE NUMBER [2][1] | FILE NUMBER [2][...] |
| SCENE NUMBER ... | SCENE NUMBER ... | SCENE NUMBER ... | SCENE NUMBER ... |

FIG. 5B

| | 511 | 512 |
|---|---|---|
| 510 SCENE NUMBER [0]: Scene #1 | FILE NUMBER [0][0]: File #1 | FILE NUMBER [0][1]: FileClose | FILE NUMBER [0][2]: UNREGISTERED |
| 520 SCENE NUMBER [1]: UNREGISTERED | FILE NUMBER [1][0]: UNREGISTERED | FILE NUMBER [1][1]: UNREGISTERED | FILE NUMBER [1][2]: UNREGISTERED |
| 530 SCENE NUMBER [2]: UNREGISTERED | FILE NUMBER [2][0]: UNREGISTERED | FILE NUMBER [2][1]: UNREGISTERED | FILE NUMBER [2][2]: UNREGISTERED |
| 540 SCENE NUMBER [3]: UNREGISTERED | FILE NUMBER [3][0]: UNREGISTERED | FILE NUMBER [3][1]: UNREGISTERED | FILE NUMBER [3][2]: UNREGISTERED |
| 550 SCENE NUMBER [4]: UNREGISTERED | FILE NUMBER [4][0]: UNREGISTERED | FILE NUMBER [4][1]: UNREGISTERED | FILE NUMBER [4][2]: UNREGISTERED |

| | 511 | 521  512 | 522  500 |
|---|---|---|---|
| 510 | SCENE NUMBER [0]: Scene #1 | FILE NUMBER [0][0]: File #1 | FILE NUMBER [0][1]: FileClose | FILE NUMBER [0][2]: UNREGISTERED |
| 520 | SCENE NUMBER [1]: Scene #2 | FILE NUMBER [1][0]: File #2 | FILE NUMBER [1][1]: FileClose | FILE NUMBER [1][2]: UNREGISTERED |
| 530 | SCENE NUMBER [2]: UNREGISTERED | FILE NUMBER [2][0]: UNREGISTERED | FILE NUMBER [2][1]: UNREGISTERED | FILE NUMBER [2][2]: UNREGISTERED |
| 540 | SCENE NUMBER [3]: UNREGISTERED | FILE NUMBER [3][0]: UNREGISTERED | FILE NUMBER [3][1]: UNREGISTERED | FILE NUMBER [3][2]: UNREGISTERED |
| 550 | SCENE NUMBER [4]: UNREGISTERED | FILE NUMBER [4][0]: UNREGISTERED | FILE NUMBER [4][1]: UNREGISTERED | FILE NUMBER [4][2]: UNREGISTERED |

FIG. 5D

| | | | |
|---|---|---|---|
| 510 | SCENE NUMBER [0]: Scene #1 | FILE NUMBER [0][0]: File #1 | FILE NUMBER [0][1]: FileClose | FILE NUMBER [0][2]: UNREGISTERED |
| 520 | SCENE NUMBER [1]: Scene #2 | FILE NUMBER [1][0]: File #2 | FILE NUMBER [1][1]: FileClose | FILE NUMBER [1][2]: UNREGISTERED |
| 530 | SCENE NUMBER [2]: Scene #3 | FILE NUMBER [2][0]: File #3 | FILE NUMBER [2][1]: UNREGISTERED | FILE NUMBER [2][2]: UNREGISTERED |
| 540 | SCENE NUMBER [3]: UNREGISTERED | FILE NUMBER [3][0]: UNREGISTERED | FILE NUMBER [3][1]: UNREGISTERED | FILE NUMBER [3][2]: UNREGISTERED |
| 550 | SCENE NUMBER [4]: UNREGISTERED | FILE NUMBER [4][0]: UNREGISTERED | FILE NUMBER [4][1]: UNREGISTERED | FILE NUMBER [4][2]: UNREGISTERED |

FIG. 5E

| | | 531 | 532 | |
|---|---|---|---|---|
| 510 | SCENE NUMBER [0]: Scene #1 | FILE NUMBER [0][0]: File #1 | FILE NUMBER [0][1]: FileClose | FILE NUMBER [0][2]: UNREGISTERED |
| 520 | SCENE NUMBER [1]: Scene #2 | FILE NUMBER [1][0]: File #2 | FILE NUMBER [1][1]: FileClose | FILE NUMBER [1][2]: UNREGISTERED |
| 530 | SCENE NUMBER [2]: Scene #3 | FILE NUMBER [2][0]: File #3 | FILE NUMBER [2][1]: File #4 | FILE NUMBER [2][2]: UNREGISTERED |
| 540 | SCENE NUMBER [3]: UNREGISTERED | FILE NUMBER [3][0]: UNREGISTERED | FILE NUMBER [3][1]: UNREGISTERED | FILE NUMBER [3][2]: UNREGISTERED |
| 550 | SCENE NUMBER [4]: UNREGISTERED | FILE NUMBER [4][0]: UNREGISTERED | FILE NUMBER [4][1]: UNREGISTERED | FILE NUMBER [4][2]: UNREGISTERED |

| | | | |
|---|---|---|---|
| 510 | SCENE NUMBER [0]: Scene #1 | FILE NUMBER [0][0]: File #1 | FILE NUMBER [0][1]: FileClose | FILE NUMBER [0][2]: UNREGISTERED |
| 520 | SCENE NUMBER [1]: Scene #2 | FILE NUMBER [1][0]: File #2 | FILE NUMBER [1][1]: FileClose | FILE NUMBER [1][2]: UNREGISTERED |
| 530 | SCENE NUMBER [2]: Scene #3 | FILE NUMBER [2][0]: File #3 | FILE NUMBER [2][1]: File #4 | FILE NUMBER [2][2]: UNREGISTERED |
| 540 | SCENE NUMBER [3]: Scene #4 | FILE NUMBER [3][0]: File #5 | FILE NUMBER [3][1]: UNREGISTERED | FILE NUMBER [3][2]: UNREGISTERED |
| 550 | SCENE NUMBER [4]: UNREGISTERED | FILE NUMBER [4][0]: UNREGISTERED | FILE NUMBER [4][1]: UNREGISTERED | FILE NUMBER [4][2]: UNREGISTERED |

| | 541 | 542 |
|---|---|---|
| 510 SCENE NUMBER [0]: Scene #1 | FILE NUMBER [0][0]: File #1 | FILE NUMBER [0][1]: FileClose | FILE NUMBER [0][2]: UNREGISTERED |
| 520 SCENE NUMBER [1]: Scene #2 | FILE NUMBER [1][0]: File #2 | FILE NUMBER [1][1]: FileClose | FILE NUMBER [1][2]: UNREGISTERED |
| 530 SCENE NUMBER [2]: Scene #3 | FILE NUMBER [2][0]: File #3 | FILE NUMBER [2][1]: File #4 | FILE NUMBER [2][2]: FileClose |
| 540 SCENE NUMBER [3]: Scene #4 | FILE NUMBER [3][0]: File #5 | FILE NUMBER [3][1]: File #6 | FILE NUMBER [3][2]: UNREGISTERED |
| 550 SCENE NUMBER [4]: UNREGISTERED | FILE NUMBER [4][0]: UNREGISTERED | FILE NUMBER [4][1]: UNREGISTERED | FILE NUMBER [4][2]: UNREGISTERED |

| 510 | SCENE NUMBER [0]: Scene #1 | FILE NUMBER [0][0]: File #1 | FILE NUMBER [0][1]: FileClose | FILE NUMBER [0][2]: UNREGISTERED |
|---|---|---|---|---|
| 520 | SCENE NUMBER [1]: Scene #2 | FILE NUMBER [1][0]: File #2 | FILE NUMBER [1][1]: FileClose | FILE NUMBER [1][2]: UNREGISTERED |
| 530 | SCENE NUMBER [2]: Scene #3 | FILE NUMBER [2][0]: File #3 | FILE NUMBER [2][1]: File #4 | FILE NUMBER [2][2]: FileClose |
| 540 | SCENE NUMBER [3]: Scene #4 | FILE NUMBER [3][0]: File #5 | FILE NUMBER [3][1]: File #6 | FILE NUMBER [3][2]: FileClose |
| 550 | SCENE NUMBER [4]: Scene #5 | FILE NUMBER [4][0]: File #7 | FILE NUMBER [4][1]: File #8 | FILE NUMBER [4][2]: FileClose |
|  | 551 | 552 | 553 | 500 |

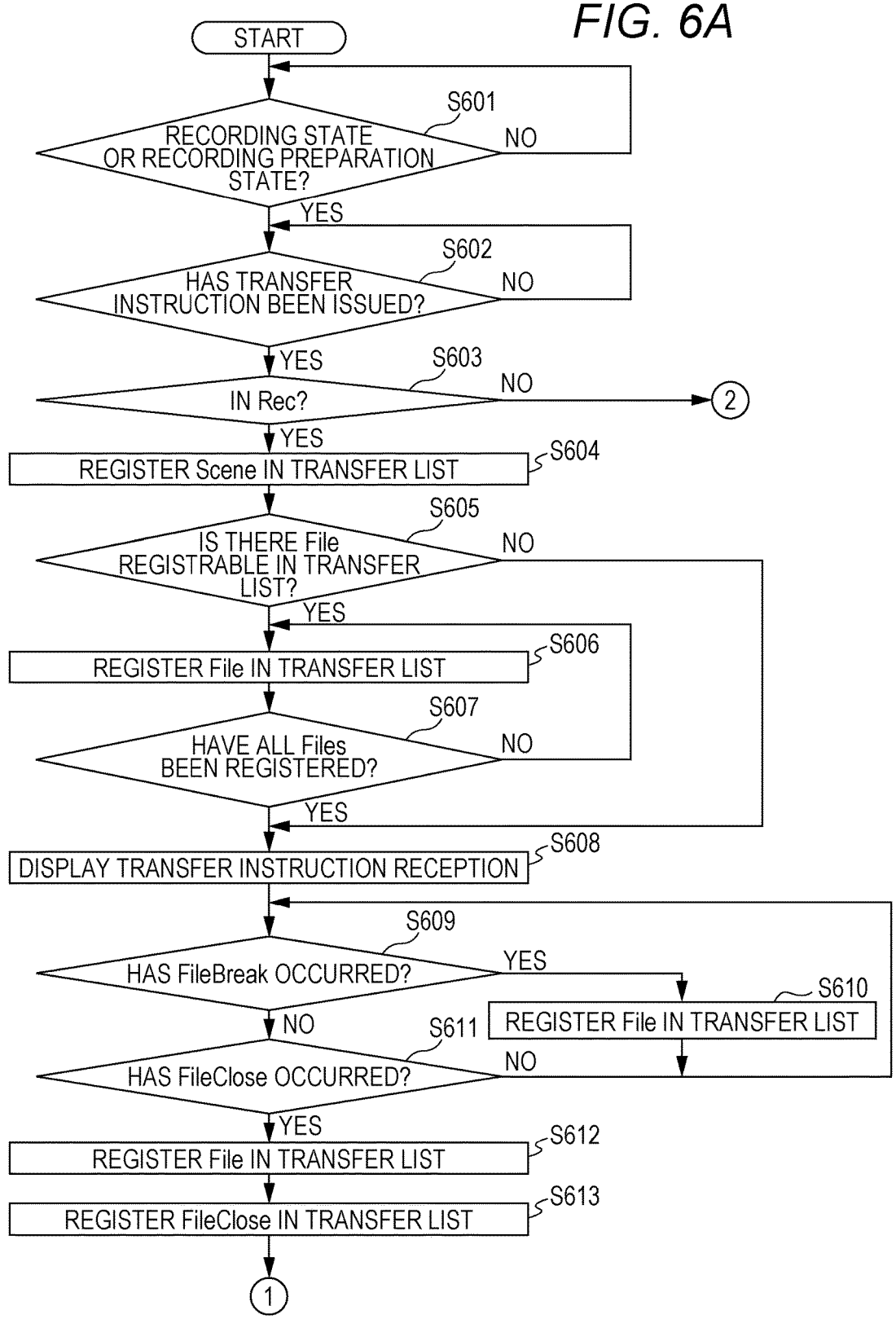

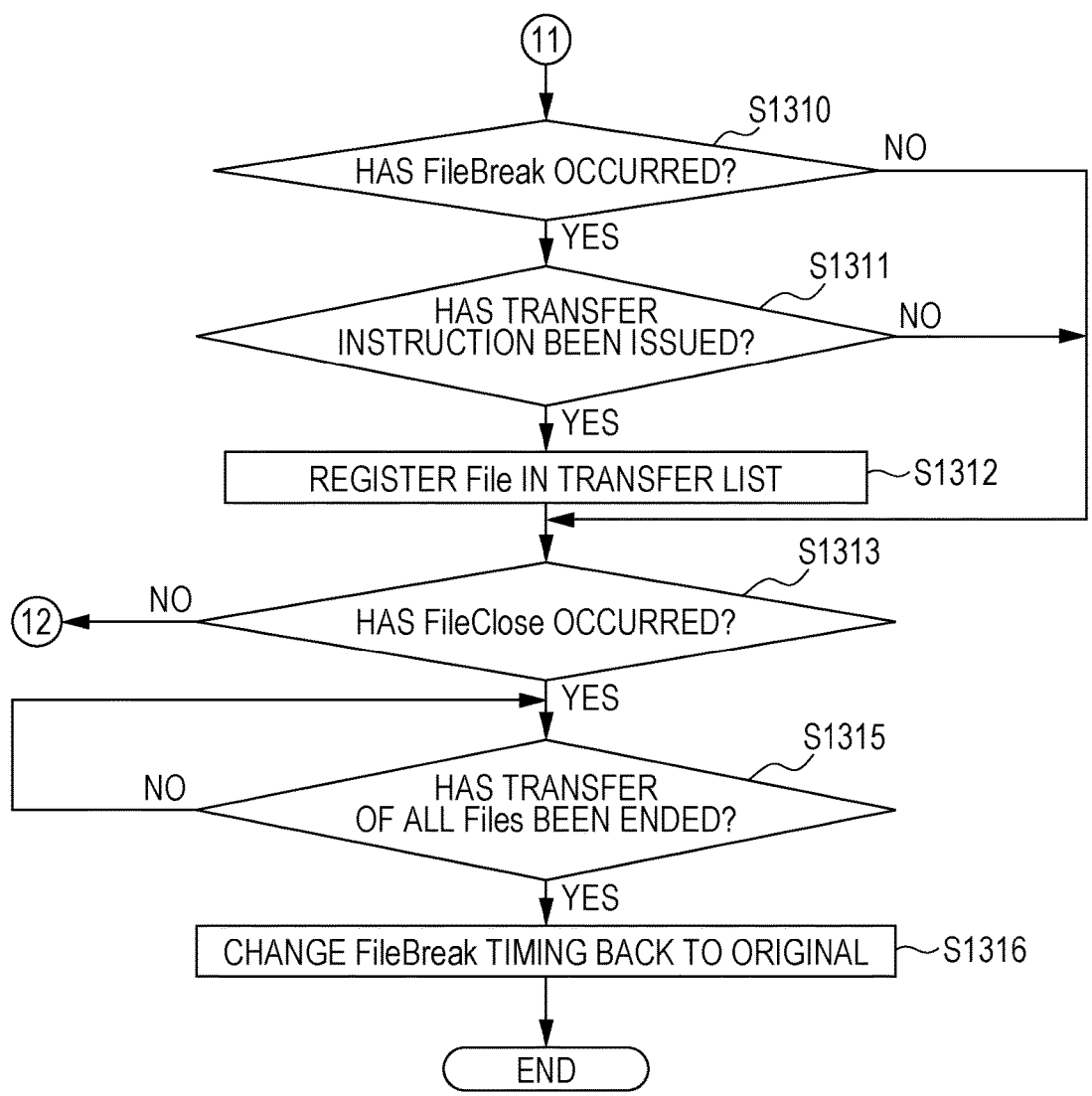

IMAGE RECORDING APPARATUS, CONTROL METHOD OF THE SAME, AND RECORDING MEDIUM

BACKGROUND OF THE INVENTION

Field of the Invention

The present invention relates to an image recording apparatus that records image data on a recording medium, and transfers the image data recorded on the recording medium to an external apparatus, a control method of the same, and a recording medium.

Description of the Related Art

A digital video camera (hereinafter, simply referred to as a "video camera") converts an optical image into an electrical signal using an image sensor, and records the electrical signal as digital image data on an internal memory of the camera or a removable recording medium such as a CF card and an SD memory card. The recorded digital image data can be transferred to an external device such as a personal computer (PC) and a mobile terminal (smartphone, tablet terminal, etc.) using various communication units including a universal serial bus (USB) and a wireless local area network (LAN).

In recent years, a function of transferring data via a wireless LAN has been widespread in particular. Such a function realizes data transfer between a video camera that has acquired authentication of the Wireless Fidelity (Wi-Fi), and a PC or a mobile terminal. General data transfer methods include a File Transfer Protocol (FTP), a HyperText Transfer Protocol (HTTP), a Real-time Transport Protocol (RTP), and the like. In transferring digital image data such as movie data obtained through image capturing performed by the video camera, the FTP is often used. The FTP is often used as a file transfer protocol functioning on a higher layer of a Transmission Control Protocol/Internet Protocol (TCP/IP). The video camera operates as an FTP client, and transfers image data to an external device such as a PC and a mobile terminal that has an FTP server function, via an FTP command.

In particular, many of video data handled in Electronic News Gathering (ENG) require immediacy. It is therefore required that digital image data can be promptly transferred via a network.

Japanese Patent Laid-Open No. 2009-225116 discloses a video recording apparatus that transfers, through network transmission, recorded video to an apparatus located at a remote place. The video recording apparatus searches a keyword-weight correspondence dictionary for a keyword that has been input from a keyword input unit during the recording of a movie file, and records a corresponding weight in association with a time on the movie file. When transferring the movie file through a network, the video recording apparatus divides the movie file as a separate movie file for transfer, every certain period of time. The video recording apparatus sequentially transfers the obtained movie files for transfer from movie files having larger total weights associated with the respective times. If the transfer of all the movie files for transfer is ended, a playlist generation unit generates a playlist in which the transferred files are rearranged in the order of record times. The video recording apparatus then transfers the generated playlist.

In addition, Japanese Patent Laid-Open No. 2005-328154 discloses a recording apparatus that records video data obtained by an imaging unit, on a randomly-accessible recording medium. The recording apparatus records video data output from an image sensor, on a first file provided in the recording medium. If a division instruction unit receives, during the image capturing performed by the image sensor, a division instruction input from a user, the recording apparatus records video data that has been output from the image sensor from the time point when the division instruction had been received, on a second file provided in the recording medium.

SUMMARY OF THE INVENTION

According to an aspect of the present invention, an image recording apparatus that can communicate with an external apparatus includes a processor and a communication interface, wherein the processor functions at least as a recording unit, a completion unit, a first input unit, and a transmission unit, wherein the recording unit is configured to record movie data on at least one recording medium, wherein the completion unit is configured to complete a movie file based on movie data recorded by the recording unit, wherein the first input unit is configured to receive a predetermined instruction for transmitting at least part of movie data, recorded by the recording unit, to the external apparatus, wherein the transmission unit is configured to transmit, via the communication interface, at least one of movie files completed by the completion unit, based on the predetermined instruction, and wherein, in a case in which the first input unit receives the predetermined instruction while the recording unit is recording the movie data, the completion unit completes a recorded part of the movie data being recorded, as a movie file, and the transmission unit automatically transmits the completed movie file via the communication interface.

Further features of the present invention will become apparent from the following description of exemplary embodiments (with reference to the attached drawings).

BRIEF DESCRIPTION OF THE DRAWINGS

FIGS. 5A to 5H are diagrams for illustrating a transfer list according to the first exemplary embodiment.

FIGS. 6A and 6B are flowcharts illustrating transfer list registration processing of the video camera according to the first exemplary embodiment.

FIGS. 13A and 13B are flowcharts illustrating file generation control processing and transfer list registration processing of the video camera according to the fourth exemplary embodiment.

DESCRIPTION OF THE EMBODIMENTS

Preferred exemplary embodiments of the present invention will be described below with reference to the attached drawings.

First Exemplary Embodiment

Figure 1:
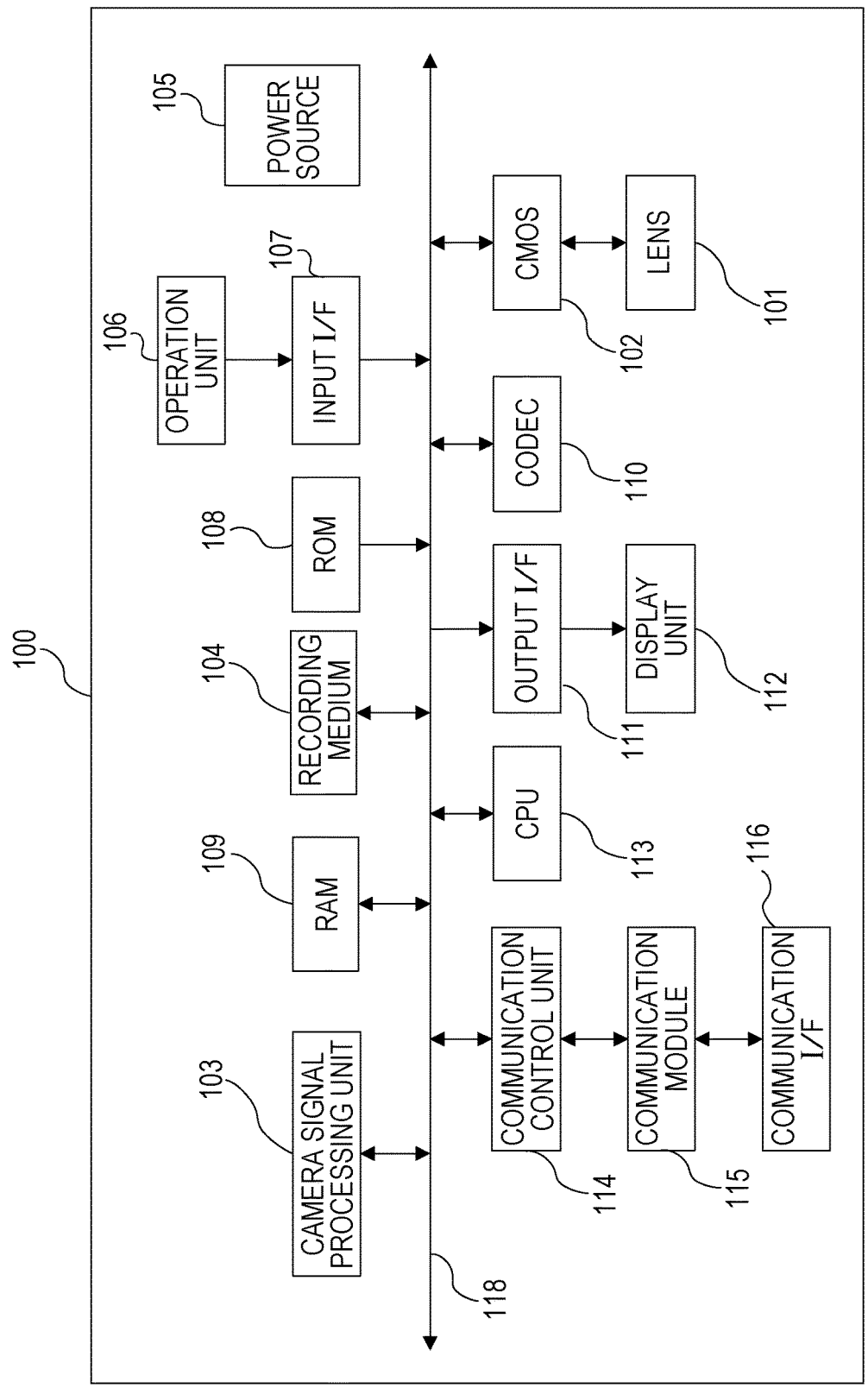
FIG. 1 is a block diagram illustrating a schematic configuration of a video camera according to the first exemplary embodiment.

FIG. 1 is a block diagram illustrating a schematic configuration of a video camera 100 according to a first exemplary embodiment that functions as an image recording apparatus to which the present invention is applied. The video camera 100 includes a lens 101, a complementary metal oxide semiconductor (CMOS) 102, a camera signal processing unit 103, a recording medium 104, a power source 105, an operation unit 106, an input interface (I/F) 107, a read-only memory (ROM) 108, a random access memory (RAM) 109, a coder decoder (CODEC) 110, an output I/F 111, a display unit 112, a central processing unit (CPU) 113, a communication control unit 114, a communication module 115, and a communication I/F 116. The video camera 100 performs data input and output via a data bus 118.

The lens 101 is an imaging lens including a focus mechanism, a diaphragm mechanism, and the like, and forms an optical image of a subject.

The CMOS 102 is an image sensor, and includes an analog-to-digital (A/D) converter. After converting an optical image into an analog electrical signal, the CMOS 102 converts the analog electrical signal into a digital signal. In addition, an image sensor is not limited to the CMOS image sensor, and may be an image sensor such as a charge coupled device (CCD) image sensor.

The camera signal processing unit 103 performs resizing processing such as predetermined pixel interpolation/reduction, color conversion, various types of correction processing, and the like, on the digital signal converted by the CMOS 102.

The recording medium 104 is a flash memory such as an SD memory card and an internal memory, and records video data and audio data that are obtained through image capturing, and information necessary for the control of the CPU 113.

The power source 105 is an alternating-current (AC) power source or a battery, and supplies necessary power to each unit in the video camera 100.

The operation unit 106 receives an operation from the user. Information of the received operation is input to the data bus 118 via the input I/F 107. For example, via the operation unit 106, the user selects encoded video data recorded on the recording medium 104, and issues a transfer instruction for transferring the selected video data to an external device (not illustrated), with which the communication control unit 114 performs communication. If the transfer instruction is issued, numbers of transfer target encoded files and numbers of scenes each collectively including a group of transfer target encoded files are saved into the RAM 109 via the CPU 113 according to the format of a transfer list 500 illustrated in FIG. 5A, which will be described later.

The ROM 108 stores a program for starting up the video camera 100. When an electrical signal is supplied from the power source 105 via the operation unit 106, the program is loaded into the RAM 109 by the CPU 113.

The RAM 109 functions as a work area of the CPU 113. In addition, the work area of the CPU 113 is not limited to the RAM 109, and may be an external recording device (not illustrated) such as a hard disc device.

The CODEC 110 reproduces video data and audio data that are recoded on the RAM 109 and the recording medium 104. The reproduced video data is displayed on the display unit 112. In addition, the reproduced audio data is supplied to a loudspeaker (not illustrated) to be output therefrom. The CODEC 110 performs compression encoding at a predetermined bit rate and in a predetermined format, or decoding of video compression encoded data. In addition, although audio is not especially illustrated in the drawing, an audio signal can also be handled through similar processing by using the lens 101 and the CMOS 102 as a microphone, and using the display unit 112 as a loudspeaker. When a video is recorded, audio is simultaneously recorded together with the video. By multiplexing the video and the audio in the CODEC 110, video data with audio can be generated.

Based on display data such as a graphical user interface (GUI) that is generated by the CPU 113 according to a program, the output I/F 111 outputs a display signal for performing display on the display unit 112.

The CPU 113 executes a program loaded from the ROM 108 into the RAM 109. The CPU 113 manages information about the recording of scenes and files in the recording of videos. The CPU 113 executes processing such as file operation processing including file break and file close, which will be described later, and acquisition of information thereof, control of a recording operation of the video camera (change of a recording state and a recording preparation state), transfer list management, and the like.

The communication control unit 114 transmits and receives control data, video data, and audio data with an external device (not illustrated) such as an FTP server via the communication module 115 and the communication I/F 116.

Figure 2A:
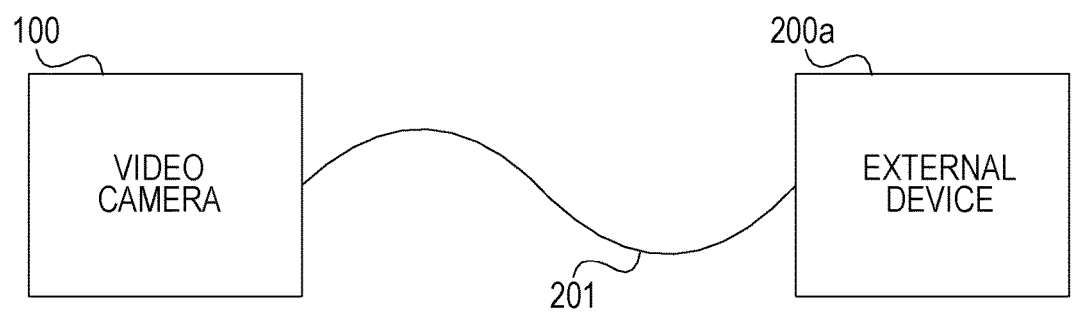
FIGS. 2A and 2B are diagrams each illustrating a connection example of the video camera and an external device according to the first exemplary embodiment.
Figure 2B:
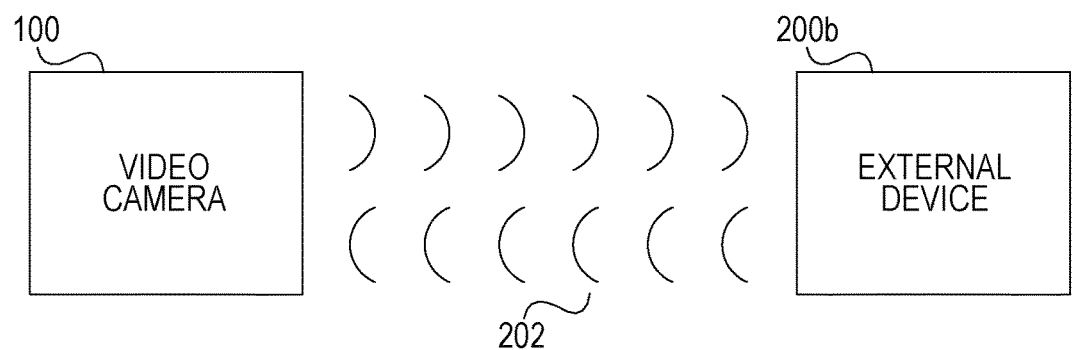

FIGS. 2A and 2B are diagrams each illustrating a connection example of the video camera 100 and an external device according to the first exemplary embodiment. The video camera 100 can be connected to the external device via at least either wired connection or wireless connection, which will be described below.

FIG. 2A is a schematic diagram illustrating an example in which the video camera 100 and an external device 200a are connected in a wired manner. The external device 200a is an external device that performs communication with the video camera 100 via a cable 201. In addition, the external device 200a may be a device that directly performs communication with the video camera 100, or may be a device connected to the video camera 100 via a relay device such as a network hub. The present invention can be applied as long as the communication performed therebetween is communication that uses a wired medium such as a wired LAN and a USB.

FIG. 2B is a schematic diagram illustrating an example in which the video camera 100 and an external device 200b are wirelessly connected. The external device 200b is an external device that performs communication with the video camera 100 via wireless communication 202. In addition, the external device 200b may be a device that directly performs wireless communication with the video camera 100, or may be a device connected to the video camera 100 via a wireless relay device such as an access point. The present invention can be applied as long as the connection established therebetween is connection that uses wireless communication such as the Wi-Fi and Bluetooth (registered trademark).

Figure 3:
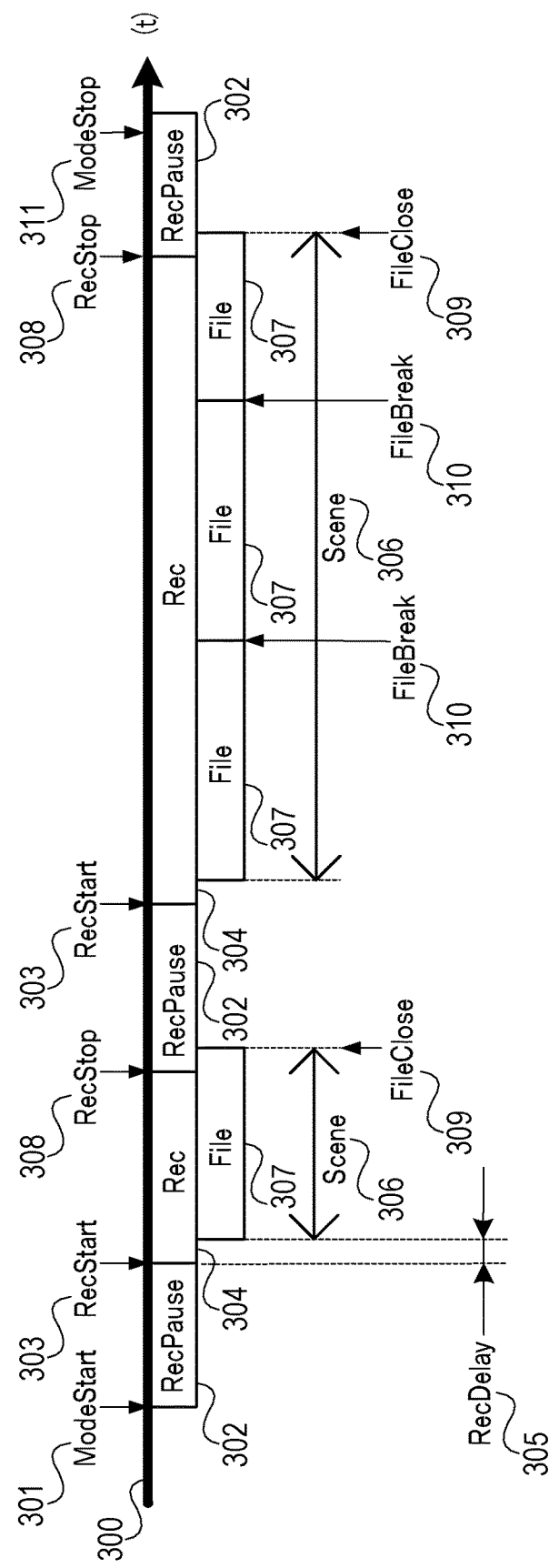
FIG. 3 is a schematic diagram illustrating a relationship between a recording operation, scenes, and files in the video camera according to the first exemplary embodiment.

FIG. 3 is a schematic diagram illustrating a relationship between a recording operation, scenes, and files in the video camera 100 according to the first exemplary embodiment. A horizontal axis 300 represents a time axis and indicates that time elapses toward the right side in FIG. 3.

Mode Start 301 indicates an input operation performed via the operation unit 106 for shifting the video camera 100 to the recording preparation state. When this input operation is executed, the video camera 100 shifts to the recording preparation state. Rec Pause 302 indicates the recording preparation state of the video camera 100. The recording preparation state is a state in which the video camera 100 can promptly enter the recording state upon Rec Start 303 being instructed.

The Rec Start 303 indicates an input operation of a recording start instruction that is executed via the operation unit 106 for shifting the video camera 100 to the recording state. When this input operation is executed in the recording preparation state, the video camera 100 shifts to the recording state. Rec 304 indicates the recording state of the video camera 100. In the recording state, the CODEC 110 encodes signals input via the lens 101 and the CMOS 102, in a file format for recording the signals on the recording medium 104, and the encoded signals are sequentially stored into the RAM 109. If the sizes of files stored in the RAM 109 reach an arbitrary capacity, the files are recorded on the recording medium 104. The processing is sequentially executed until Rec Stop 308 is issued.

The Rec Stop 308 indicates an input operation of a recording end instruction that is executed via the operation unit 106 for stopping the recording state and shifting the video camera 100 to the recording preparation state.

Mode Stop 311 indicates an input operation performed via the operation unit 106 for shifting the recording operation of the video camera 100 to an end state.

Rec Delay 305 indicates a time lag between a time point when the video camera 100 enters the recording state upon the Rec Start 303 being instructed, and a time point when video data actually starts to be recorded onto the recording medium 104. This time lag varies depending on a bit rate of a video to be recorded, and the arbitrary capacity set for storing on the RAM 109. In addition, a similar time lag is generated between a time point when the Rec Stop 308 is instructed and a time point when the recording is actually ended.

A scene 306 is a recording unit used when the video camera 100 records a video. The recording unit is a unit of video data recorded between the Rec Start 303 and the Rec Stop 308. It should be noted that the scene 306 is not synonymous with a file 307 to be described later. In view of a file format of the recording medium 104, if the size of data to be recorded on the recording medium 104 becomes a data size equal to or larger than a file upper limit capacity of the file format, the file needs to be divided. Such a dividing operation is referred to as file break 310. The scene 306 is defined as one scene including the files 307 obtained through the file break. A number is allocated to the scene 306 every time the Rec Start 303 is instructed, so that the scenes 306 are operated as scene #1, scene #2, and so on.

The file 307 is a video data file recorded on the recording medium 104. If the size of data accumulated in the RAM 109 in response to the Rec Start 303 reaches the arbitrary capacity, the data starts to be stored into the recording medium 104 as the file 307. In the recording state, since video data are sequentially written into the RAM 109, data stored as the files 307 also sequentially increase. Until file close 309 or the file break 310 occurs, the files 307 are in an uncompleted state and in a state of being unable to be read out for other types of processing. If the file close 309 or the file break 310 occurs, the files 307 enter a completed state. A number is allocated to the file 307 every time the file 307 is completed, so that the files 307 are operated as file #1, file #2, and so on.

The file close 309 is a file operation for bringing the files 307 sequentially recorded on the recording medium 104 by the recording operation of the video camera 100, into the completed state in response to the Rec Stop 308 being instructed. If this operation is executed, the files 307 become readable and editable for other types of processing.

The file break 310 is a file operation performed for recording a file in a divided manner when a file having a size equal to or larger than a specific size is stored into the recording medium 104, in view of the file format of the recording medium 104. This file operation is automatically performed within the video camera 100 by the CPU 113 identifying the file format of the recording medium 104. Thus, if the user inputs the Rec Start 303 via the operation unit 106 only once, when a record time continues for a certain time or more and the file 307 is written up to the upper limit of the file format of the recording medium 104, the file 307 enters the completed state by the file break 310, and the generation of a new file 307 is started.

Figure 4A:
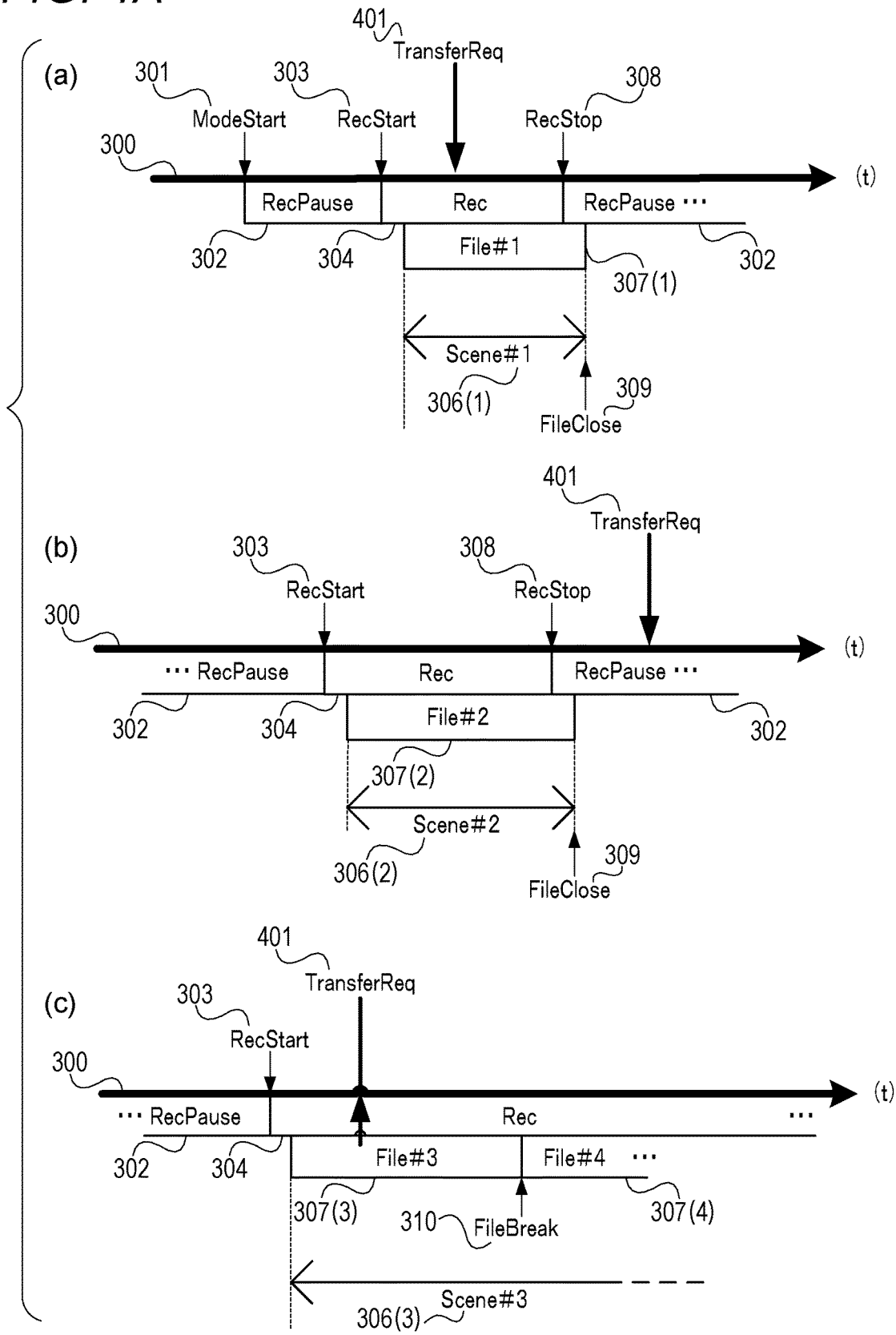
FIG. 4A, which is composed of FIGS. 4A (a) to 4A (c), is a diagram illustrating an example of a relationship between a recording operation, scenes, files, and a transfer instruction in the video camera according to the first exemplary embodiment.
Figure 4B:
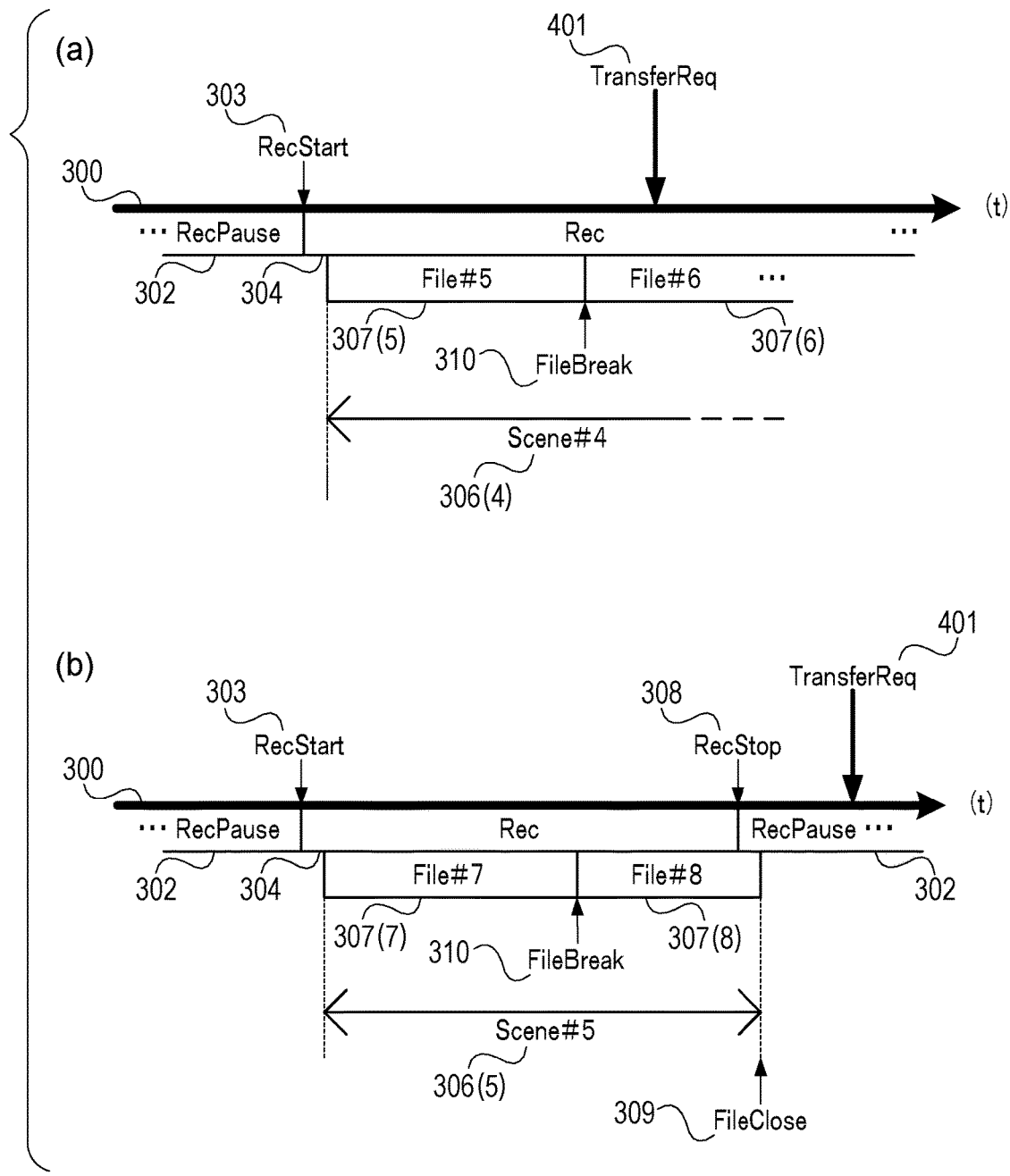
FIG. 4B, which is composed of FIGS. 4B (a) and 4B (b), is a diagram illustrating an example of a relationship between a recording operation, scenes, files, and a transfer instruction in the video camera according to the first exemplary embodiment.

FIGS. 4A and 4B are diagrams each illustrating an example of a relationship between a recording operation, scenes, files, and a transfer instruction in the video camera 100 according to the first exemplary embodiment.

FIG. 4A (a) illustrates a state in which a transfer instruction has been issued so as to transfer a scene being recorded, to an external device, in the recording state (the Rec 304) of the video camera 100.

A scene ∩1 (306 (1)) is assumed to be initially recorded onto the recording medium 104, and has an allocated number "#1".

Similarly to the scene #1 (306 (1)), a file #1 (307 (1)) is assumed to be initially recorded onto the recording medium 104, and has an allocated number "#1".

Transfer Req 401 indicates an input operation performed via the operation unit 106 for instructing the transfer of the scene #1 (306 (1)) being recorded, to the external device.

If the Rec Stop 308 is instructed, the file ∩1 (307 (1)) being recorded and being in the uncompleted state is completed by the file close 309 as a file.

FIG. 4A (b) illustrates a state in which a transfer instruction has been issued so as to transfer a recorded scene to the external device, in the recording preparation state (the Rec Pause 302) caused after the recording state of the video camera 100. In FIG. 4A (b), it is assumed that the file break 310 has not occurred.

A scene ∩2 (306 (2)) is assumed to be a scene started to be recorded upon the second Rec Start 303 being instructed, and has an allocated number "#2".

Similarly to the scene #2 (306 (2)), a file #2 (307 (2)) is assumed to be a file to be secondly recorded onto the recording medium 104, and has an allocated number "#2".

If the Rec Stop 308 is instructed, the file #2 (307 (2)) being recorded and being in the uncompleted state is completed by the file close 309 as a file.

The Transfer Req 401 indicates an input operation performed via the operation unit 106 for instructing the transfer of the scene #2 (306 (2)) of which the recording has been ended, to the external device.

FIG. 4A (c) illustrates a state in which a transfer instruction has been issued so as to transfer a scene being recorded, to the external device, in the recording state (the Rec 304) of the video camera 100, and before the file break 310 occurs.

A scene #3 (306 (3)) is assumed to be a scene started to be recorded upon the third Rec Start 303 being instructed, and has an allocated number "#3". In the scene #3 (306 (3)), the file break 310 occurs for a file #3 (307 (3)), and after the file #3 (307 (3)) has been completed, a new file #4 (307 (4)) is generated.

The file #3 (307 (3)) is assumed to be a file to be thirdly recorded onto the recording medium 104, and has an allocated number "#3". The file #4 (307 (4)) is a file generated for continuously recording the scene #3 after the file break 310 has occurred for the file #3 (307 (3)).

The Transfer Req 401 indicates an input operation performed via the operation unit 106 for instructing the transfer of the scene #3 (306 (3)) being recorded, to the external device.

FIG. 4B (a) illustrates a state in which a transfer instruction has been issued so as to transfer a scene being recorded, to the external device, in the recording state (the Rec 304) of the video camera 100, and after the file break 310 has occurred.

A scene #4 (306 (4)) is assumed to be a scene started to be recorded upon the fourth Rec Start 303 being instructed, and has an allocated number "#4". In the scene #4 (306 (4)), the file break 310 occurs for a file #5 (307 (5)), and after the file #5 (307 (5)) has been completed, a new file #6 (307 (6)) is generated.

The file #5 (307 (5)) is assumed to be a file to be recorded fifth onto the recording medium 104, and has an allocated number "#5". The file #6 (307 (6)) is a file generated for continuously recording the scene #4 after the file break 310 has occurred for the file #5 (307 (5)).

The Transfer Req 401 indicates an input operation performed via the operation unit 106 for instructing the transfer of the scene #4 (306 (4)) being recorded, to the external device.

FIG. 4B (b) illustrates a state in which a transfer instruction has been issued so as to transfer a recorded scene to the external device, in the recording preparation state (the Rec Pause 302) caused after the recording state of the video camera 100. In FIG. 4B (b), it is assumed that the file break 310 has occurred.

A scene #5 (306 (5)) is assumed to be a scene started to be recorded upon the fifth Rec Start 303 being instructed, and has an allocated number "#5". In the scene (306 (5)), the file break 310 occurs for a file #7 (307 (7)), and after the file #7 (307 (7)) has been completed, a new file #8 (307 (8)) is generated.

The file #7 (307 (7)) is assumed to be a file to be recorded seventh onto the recording medium 104, and has an allocated number "#7". The file #8 (307 (8)) is a file generated for continuously recording the scene #5 after the file break 310 has occurred for the file #7 (307 (7)).

If the Rec Stop 308 is instructed, the file #8 (307 (8)) being recorded and being in the uncompleted state is completed by the file close 309 as a file.

The Transfer Req 401 indicates an input operation performed via the operation unit 106 for instructing the transfer of the scene #5 (306 (5)) of which the recording has been ended, to the external device.

FIGS. 5A to 5H are diagrams for illustrating transfer lists according to the first exemplary embodiment and a registration method thereof.

The configuration of the transfer list 500 will be described with reference to FIG. 5A. The transfer list 500 has a configuration in which scene information and file information are registered.

Lists 510, 520, 530, and so on are scene information registration tables, in which scene numbers instructed to be transferred are registered. The number of these tables is determined according to the number of registered scenes instructed to be transferred. In this example, 5 scene number registration tables [0] to [4] exist. In other words, the number of scenes that can be instructed to be transferred is 5. Nevertheless, if the transfer of a registered scene is completed, the table enters an unoccupied state, and it becomes possible to issue a transfer instruction again. Lists 511, 512, and so on are file information registration tables, in which file numbers constituting a scene registered in the list 510 are registered. Similarly, lists 521, 522, and so on are file information registration tables, in which file numbers constituting a scene registered in the list 520 are registered. The same applies to subsequent lists 530 and so on. The number of tables is determined in accordance with the maximum number of files constituting 1 scene. In this example, the number of file information registration tables is 3, and 3 files can be registered for 1 scene.

In addition, an operation can be performed using the number of scene information registration tables and the number of file information registration tables that are suitable for a system.

Figure 6B:
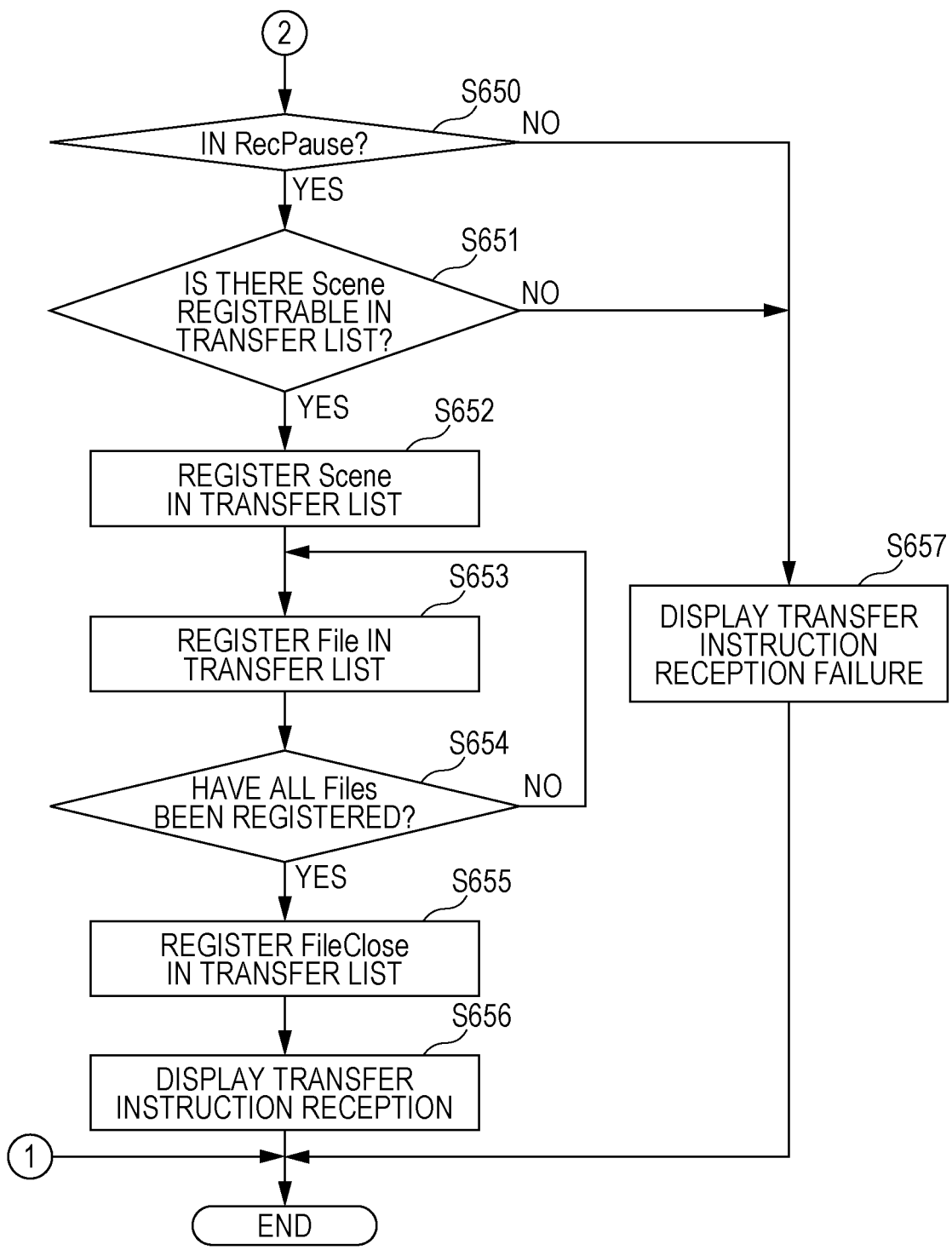

FIGS. 6A and 6B are flowcharts illustrating transfer list registration processing of the video camera 100 according to the first exemplary embodiment.

The video camera 100 checks a recording operation performed when the Transfer Req 401 serving as a transfer instruction is input as illustrated in FIGS. 4A and 4B, and the presence or absence of the file break 310, and registers the transfer list 500.

An operation performed by the video camera 100 when the Transfer Req 401 is input will be described below with reference to FIGS. 4A, 4B, and 5A to 5H. In addition, asynchronously with the processing in FIGS. 6A and 6B, the user can arbitrarily shift the video camera 100 to the recording preparation state or the recording state via the operation unit 106. In FIGS. 4A and 4B, the transition to the recording preparation state corresponds to the Mode Start 301 in each drawing, the transition to the recording state corresponds to the Rec Start 303, and the transition to the recording preparation state corresponds to the Rec Stop 308.

In step S601, the CPU 113 checks whether the video camera 100 is in the recording state or the recording preparation state. The processing is not executed in states other than the recording state and the recording preparation state (NO in step S601), and step S601 is repeated. If the video camera 100 is in the recording state or the recording preparation state (YES in step S601), the processing proceeds to step S602.

In step S602, the CPU 113 checks whether the Transfer Req 401 has been input. If the Transfer Req 401 has not been input (NO in step S602), step S602 is continued. If the Transfer Req 401 has been input (YES in step S602), the processing proceeds to step S603.

In step S603, the CPU 113 checks whether the video camera 100 is in the recording state. If the video camera 100 is in the recording state (YES in step S603), the processing proceeds to step S604. If the video camera 100 is not in the recording state (NO in step S603), the processing proceeds to step S650.

Steps S604 to S613 correspond to processing performed when the Transfer Req 401 has been input in the recording state as illustrated in FIGS. 4A (a), 4A (c) and 4B (a).

In step S604, the CPU 113 registers a scene to be transferred, in the transfer list 500. The processing in step S604 will be described with reference to FIGS. 4A (a) and 5B. At the time point when the Transfer Req 401 is input in FIG. 4A (a), the first scene recording is being performed, and lists 510 to 550 are all in an unregistered state. The CPU 113 that has detected the input of the Transfer Req 401 in step S602 acquires a scene number instructed via the Transfer Req 401 to be transferred, and registers the acquired scene number in the list 510. In this example, the scene corresponds to the scene #1 (306 (1)), and the scene #1 is registered in the list 510 as illustrated in FIG. 5B. In FIGS. 4A (c) and 4B (a), the scene information registration processing of the transfer list 500 is similarly performed through this step. As a result, the scene #3 (306 (3)) is registered in the list 530 as illustrated in FIG. 5D, and the scene #4 (306 (4)) is registered in the list 540 as illustrated in FIG. 5F.

In step S605, the CPU 113 checks whether there is a file registerable in the transfer list 500. The CPU 113 manages information of a scene currently being recorded. The scene information includes information of files constituting the scene. Based on the scene information, it can be determined whether the scene is constituted by a plurality of files using the file break 310. In FIG. 4A (a), at the time point when the Transfer Req 401 is input, the file #1 (307 (1)) is in the uncompleted state and cannot be registered in the transfer list 500. The same applies to the file #3 (307 (3)) in FIG. 4A (c). In this case (NO in step S605), the processing proceeds to step S608. On the other hand, in FIG. 4B (a), at the time point when the Transfer Req 401 is input, the file #6 (307 (6)) is in the uncompleted state, whereas the file #5 (307 (5)) has been brought into the completed state by the file break 310 and can be registered in the transfer list 500. In this case (YES in step S605), the processing proceeds to step S606, and the registration processing of the transfer list 500 is executed.

In step S606, the CPU 113 registers a file to be transferred, in the transfer list 500. The processing in step S606 will be described with reference to FIGS. 4B (a) and 5F. In FIG. 4B (a), the scenes #1 to #3 are in a registered state in the respective lists 510, 520, and 530 as illustrated in FIG. 5F. As illustrated in FIG. 5F, the CPU 113 registers the file #5 (307 (5)) in a list 541 of scene #4, which had been in the unregistered state before the execution of step S606. When step S606 is ended, the processing proceeds to step S607.

In step S607, the CPU 113 checks whether all registrable files have been registered in the transfer list 500. In FIG. 4B (a), only the file #5 (307 (5)) is in the completed state at the time point when the Transfer Req 401 is input. Nevertheless, a case in which a plurality of files is generated using the file break 310 is assumed. In this case, in step S607, it is checked whether all the files have been registered in the transfer list 500. If there is a file to be registered (NO in step S607), the processing returns to step S606. If the registration of all the files has been ended (YES in step S607), the processing proceeds to step S608.

In step S608, the CPU 113 notifies, using the display unit 112, the user that the registration in the transfer list 500 has been performed in response to the Transfer Req 401. If the display is ended, the processing proceeds to step S609.

In step S609, the CPU 113 checks whether the file break 310 has occurred for the files included in the scene being recorded. In FIGS. 4A (c) and 4B (a), at the time point when the Transfer Req 401 is input, the file #3 (307 (3)) and the file #6 (307 (6)) are in the uncompleted state, but the file break 310 may occur thereafter, and the files may enter the completed state. If the file break 310 has been detected (YES in step S609), the processing proceeds to step S610. If the file break 310 has not been detected (NO in step S609), the processing proceeds to step S611.

In step S610, the CPU 113 updates the transfer list 500. In FIG. 4A (c), the CPU 113 that has detected the file break 310 registers the file #3 (307 (3)) in the transfer list 500. More specifically, if the file #3 (307 (3)) is brought into the completed state by the file break 310 in FIG. 4A (c), as illustrated in FIG. 5D, the file #3 is registered in a list 531. Then, if the file break 310 further occurs, as illustrated in FIG. 5E, the file #4 (307 (4)) is registered in a list 532. Similarly, if the file #6 (307 (6)) is brought into the completed state by the file break 310 in FIG. 4B (a), as illustrated in FIG. 5G, the file #6 is registered in a list 542.

In step S611, the CPU 113 checks whether the file close 309 has occurred for the scene being recorded. The CPU 113 performs file close if the Rec Stop 308 is input via the operation unit 106. In FIG. 4A (a), at the time point when the Transfer Req 401 is input, the file #1 (307 (1)) is in the uncompleted state, so CPU 113 waits for the occurrence of the file close 309. If the file close 309 has been detected (YES in step S611), the processing proceeds to step S612. If the file close 309 has not been detected (NO in step S611), the processing returns to step S609, in which the occurrence of the file break 310 is detected again.

In step S612, the CPU 113 registers a file that has been brought into the completed state by the file close 309, in the transfer list 500. In FIG. 4A (a), the file #1 (307 (1)) is brought into the completed state by the file close 309, and becomes registerable in the transfer list 500. As illustrated in FIG. 5B, the file #1 (307 (1)) is registered in the list 511, and the processing proceeds to step S613.

In step S613, the CPU 113 performs file close registration for writing data indicating scene completion, in the transfer list 500. After detecting the file close 309 and registering the file in the transfer list 500, the CPU 113 registers the completion of the scene in the transfer list 500. In FIG. 5B, the CPU 113 registers the file close in the list 512. If step S613 is ended, the transfer list registration processing is completed.

In step S650, the CPU 113 checks whether the video camera 100 is in the recording preparation state. If the video camera 100 is in the recording preparation state (YES in step S650), the processing proceeds to step S651. If the video camera 100 is not in the recording preparation state (NO in step S650), the processing proceeds to step S657.

Steps S651 to S656 correspond to processing performed when the Transfer Req 401 has been input in the recording preparation state as illustrated in FIGS. 4A (b) and 4B (b).

In step S651, the CPU 113 checks whether there is a scene registerable in the transfer list 500. The CPU 113 determines the presence or absence of a last-recorded scene. The CPU 113 can determine the presence or absence of the recording for controlling the recording performed on the recording medium 104. If there is a scene that can be added to the transfer list 500 (YES in step S651), the processing proceeds to step S652. If there is no scene that can be added to the transfer list 500 (NO in step S651), the processing proceeds to step S657.

In step S652, the CPU 113 registers a scene to be transferred, in the transfer list 500. The processing in step S652 will be described with reference to FIGS. 4A (b) and 5C. In FIG. 4A (b), the scene #1 is in the registered state in the list 510 as illustrated in FIG. 5C. The CPU 113 that has detected the input of the Transfer Req 401 in step S602 acquires a scene number instructed via the Transfer Req 401 to be transferred, and registers the acquired scene number in the list 520. In this example, the scene corresponds to the scene #2 (306 (2)), and the scene #2 is registered in the list 520 as illustrated in FIG. 5C. In FIG. 4B (b), the scene information registration processing of the transfer list 500 is similarly performed through this step. As a result, the scene #5 (306 (5)) is registered in the list 550 as illustrated in FIG. 5H.

In step S653, similarly to step S606, the CPU 113 registers a file to be transferred, in the transfer list 500. The processing in step S653 will be described with reference to FIGS. 4A (b) and 5C. As illustrated in FIG. 5C, the CPU 113 registers the file #2 (307 (2)) in the list 521 of the scene #2, which had been in the unregistered state before the execution of step S653. In FIG. 4B (b), the file information registration processing of the transfer list 500 is similarly performed through this step. As illustrated in FIG. 5H, the CPU 113 registers the file #7 (307 (7)) and the file #8 (307 (8)) in respective lists 551 and 552 of the scene #5, which had been in the unregistered state before the execution of step S653. If step S653 is ended, the processing proceeds to step S654.

In step S654, the CPU 113 checks whether all registrable files have been registered in the transfer list 500. If all the registrable files have been registered (YES in step S654), the processing proceeds to step S655. If there is an unregistered file (NO in step S654), the processing returns to step S653. In FIG. 4B (b), the file #7 (307 (7)) is registered in step S653 performed first. Then, if it is detected in step S654 that the file #8 (307 (8)) has not been registered, the file #8 (307 (8)) is registered in step S653 performed again, and the processing proceeds to step S655.

In step S655, the CPU 113 performs file close registration for writing data indicating scene completion, in the transfer list 500. In step S655, the video camera 100 is in the recording preparation state, and there are only scenes on which the file close has already been performed. Thus, there is no need to perform processing of monitoring the file close. In FIG. 4A (b), the CPU 113 registers the file close in the list 522 as illustrated in FIG. 5C. In addition, in FIG. 4B (b), the CPU 113 registers the file close in a list 553 as illustrated in FIG. 5H. After this step is ended, the processing proceeds to step S656.

In step S656, the CPU 113 notifies, using the display unit 112, the user that the registration in the transfer list 500 has been performed in response to the Transfer Req 401. If step S656 is ended, the transfer list registration processing is completed.

In step S657, the CPU 113 notifies the user that the transfer list registration processing has failed. Although a transfer instruction has been issued via the operation unit 106, there is no scene to be registered in the transfer list 500, and the transfer processing is not executed. Thus, the CPU 113 notifies the user of this using the display unit 112. If step S657 is ended, the transfer list registration processing is completed.

Figure 7:
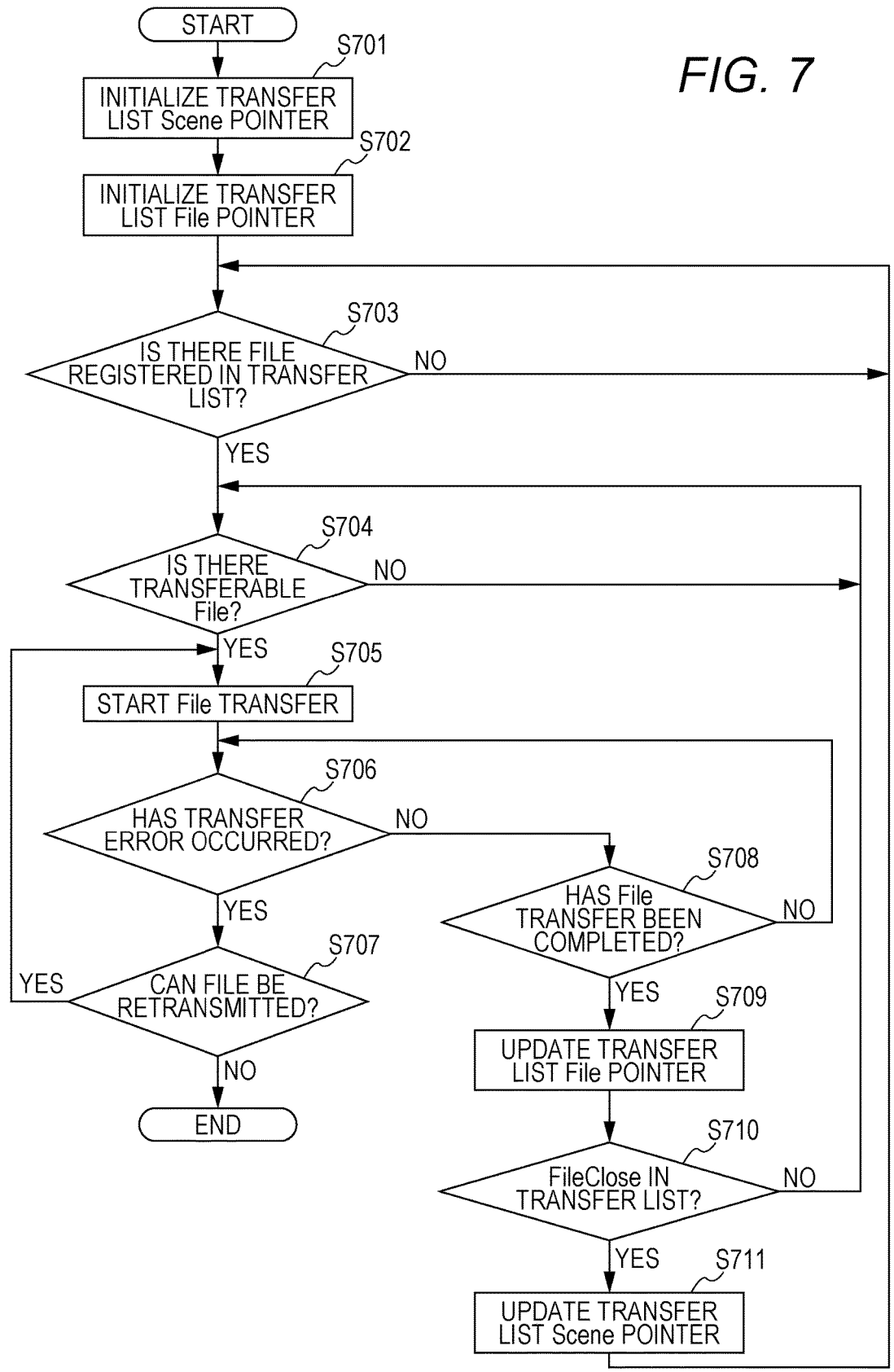
FIG. 7 is a flowchart illustrating transfer control processing of the video camera according to the first exemplary embodiment.

The video camera 100 transfers a scene to the external device according to the transfer list 500 registered through the transfer list registration processing illustrated in FIGS. 6A and 6B. FIG. 7 is a flowchart illustrating transfer control processing of the video camera 100 according to the first exemplary embodiment.

In step S701, the CPU 113 initializes a scene pointer indicating a scene to be registered in the transfer list 500, and the processing proceeds to step S702.

In step S702, the CPU 113 initializes a file pointer indicating a file to be registered in the transfer list 500, and the processing proceeds to step S703.

In step S703, the CPU 113 checks the presence or absence of a file registered in the transfer list 500. If there is a file registered in the transfer list 500 (YES in step S703), the processing proceeds to step S704. If there is no file registered in the transfer list 500 (NO in step S703), the CPU 113 continues to check until a registered file is found.

In step S704, the CPU 113 checks whether there is a file that is registered in the transfer list 500 and transferable to the external device. If there is a transferable file (YES in step S704), the processing proceeds to step S705. If there is no transferable file (NO in step S704), the CPU 113 continues to check until a transferable file is found.

In step S705, the CPU 113 starts transferring the file that is registered in the transfer list 500 and transferable to the external device, and the processing proceeds to step S706.

In step S706, the CPU 113 checks whether a transfer error has occurred. If a transfer error has occurred (YES in step S706), the processing proceeds to step S707. If no transfer error has occurred (NO in step S706), the processing proceeds to step S708.

In step S707, the CPU 113 checks whether the file with the transfer error can be retransmitted. If the file can be retransmitted (YES in step S707), the processing returns to step S705, in which the CPU 113 starts transferring the file to the external device again. If the file cannot be retransmitted (NO in step S707), the processing is completed.

In step S708, the CPU 113 checks whether the transfer of the file started to be transferred in step S705 has been completed. If the transfer has been completed (YES in step S708), the processing proceeds to step S709. If the transfer has not been completed (NO in step S708), the processing returns to step S706, in which the CPU 113 monitors a transfer error that occurs during the transfer.

In step S709, the CPU 113 updates the file pointer in the transfer list 500 because there is the file of which the transfer has been completed in step S708, and the processing proceeds to step S710.

In step S710, the CPU 113 checks whether all files related to the scene being referred to on the transfer list 500 have been transferred, and the file pointer on the transfer list 500 is referring to "File Close". If the file pointer is referring to "File Close" (YES in step S710), the processing proceeds to step S711. If the file pointer is not referring to "File Close" (NO in step S710), the processing returns to step S704.

In step S711, the CPU 113 updates the scene pointer on the transfer list 500, and the processing returns to step S703.

Second Exemplary Embodiment

Next, a second exemplary embodiment will be described. In addition, the configuration and basic operations of a video camera 100 are the same as those described in the first exemplary embodiment. The following description will be given mainly of a difference from the first exemplary embodiment.

Figure 8A:
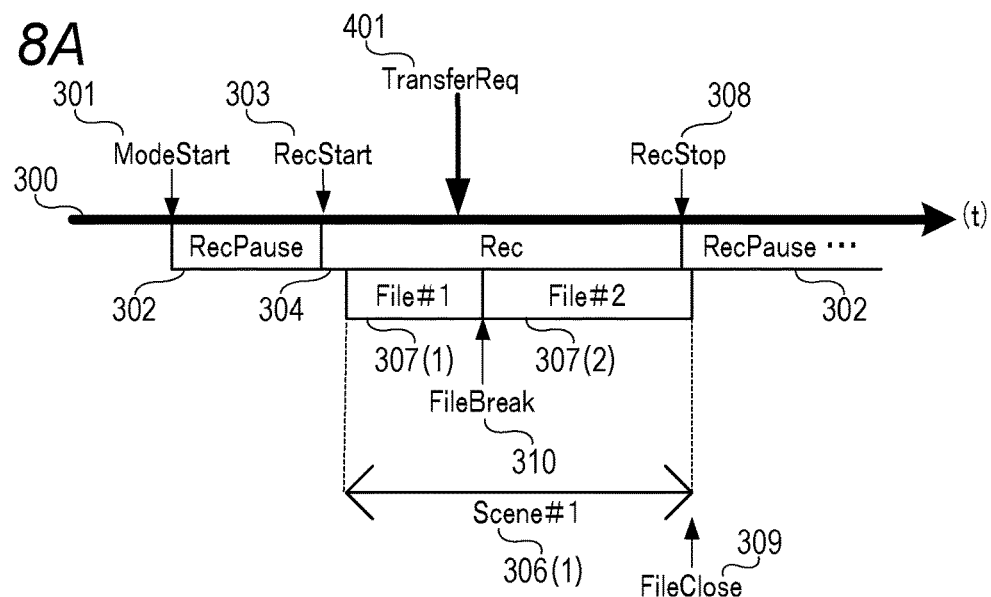
FIGS. 8A to 8C are diagrams illustrating an example of a relationship between a recording operation, scenes, files, and a transfer instruction in a video camera according to a second exemplary embodiment.
Figure 8B:
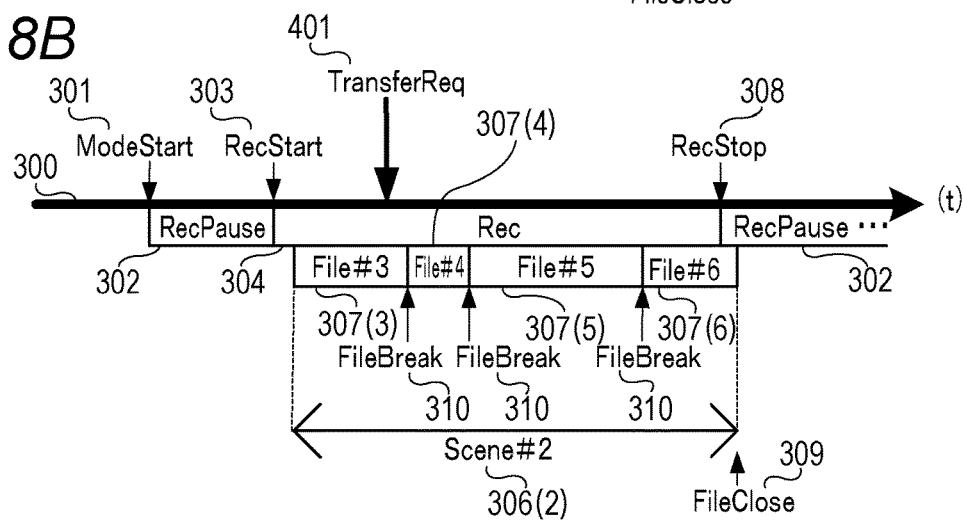
Figure 8C:
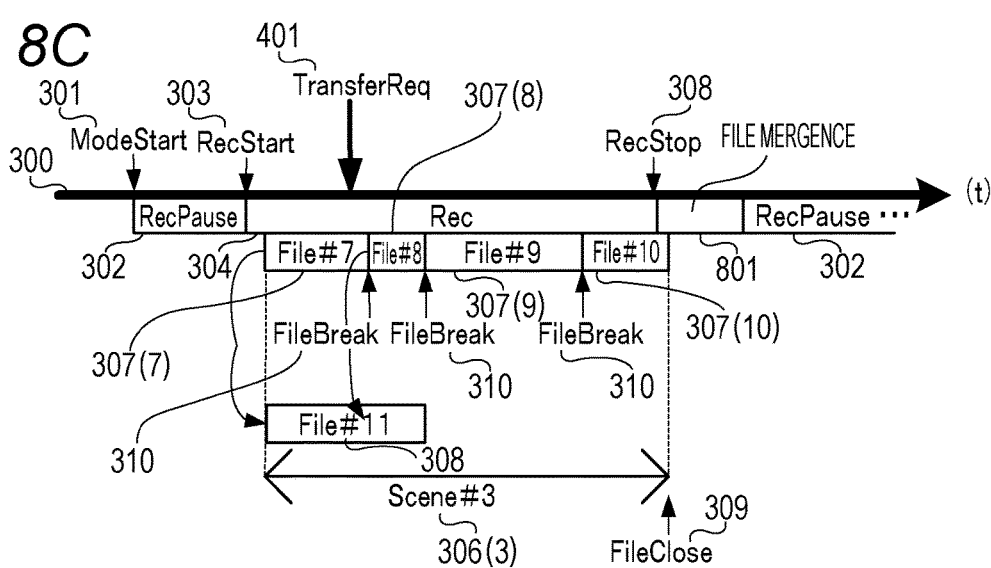

FIGS. 8A to 8C are diagrams illustrating an example of a relationship between a recording operation, scenes, files, and a transfer instruction in the video camera 100 according to the second exemplary embodiment.

FIG. 8A illustrates a state in which a transfer instruction has been issued so as to transfer a scene being recorded, to an external device, in the recording state (the Rec 304) of the video camera 100.

A scene #1 (306 (1)) is assumed to be initially recorded onto the recording medium 104, and has an allocated number "#1".

Similarly to the scene #1 (306 (1)), a file #1 (307 (1)) is assumed to be initially recorded onto the recording medium 104, and has an allocated number "#1".

The Transfer Req 401 indicates an input operation performed via the operation unit 106 for instructing the transfer of the scene #1 (306 (1)) being recorded, to the external device.

In this case, for promptly transferring the file #1 (307 (1)) being recorded on the recording medium 104, the file break 310 is triggered by the Transfer Req 401. In response to this, the file #1 (307 (1)) at the time point when the transfer instruction has been received is brought into the completed state, and a new file #2 (307 (2)) for continuously recording the scene #1 is generated.

If the Rec Stop 308 is instructed, the file #2 (307 (2)) being recorded and being in the uncompleted state is completed by the file close 309 as a file.

FIG. 8B illustrates a state in which a transfer instruction has been issued so as to transfer a scene being recorded, to the external device, in the recording state (the Rec 304) of the video camera 100.

A scene #2 (306 (2)) is assumed to be a scene started to be recorded upon the second Rec Start 303 being instructed, and has an allocated number "#2".

A file #3 (307 (3)) is assumed to be a file to be thirdly recorded onto the recording medium 104, and has an allocated number "#3".

The Transfer Req 401 indicates an input operation performed via the operation unit 106 for instructing the transfer of the scene #2 (306 (2)) being recorded, to the external device.

In this case, for promptly transferring the file #3 (307 (3)) being recorded on the recording medium 104, the file break 310 is triggered by the Transfer Req 401. In response to this, the file #3 (307 (3)) at the time point when the transfer instruction has been received is brought into the completed state, and a new file #4 (307 (4)) for continuously recording the scene #2 is generated.

Then, if the total file size of the file #3 (307 (3)) and the file #4 (307 (4)) reaches the file upper limit capacity of the file format, the file break 310 occurs for the file #4 (307 (4)). In response to this, the file #4 (307 (4)) is brought into the completed state, and a new file #5 (307 (5)) for continuously recording the scene #2 is generated. As for files following the file #5 (307 (5)), if the file size of a corresponding file reaches the file upper limit capacity of the file format, the file break 310 occurs. In FIG. 8B, the file break 310 occurs for the file #5 (307 (5)). The file #5 (307 (5)) is accordingly brought into the completed state, and a new file #6 (307 (6)) for continuously recording the scene #2 is generated.

If the Rec Stop 308 is instructed, the file #6 (307 (6)) being recorded and being in the uncompleted state is completed by the file close 309 as a file.

FIG. 8C illustrates a state in which a transfer instruction has been issued so as to transfer a scene being recorded, to the external device, in the recording state (the Rec 304) of the video camera 100.

A scene #3 (306 (3)) is assumed to be a scene started to be recorded upon the third Rec Start 303 being instructed, and has an allocated number "#3".

A file #7 (307 (7)) is assumed to be a file to be recorded seventh onto the recording medium 104, and has an allocated number "#7".

The Transfer Req 401 indicates an input operation performed via the operation unit 106 for instructing the transfer of the scene #3 (306 (3)) being recorded, to the external device.

In this case, for promptly transferring the file #7 (307 (7)) being recorded on the recording medium 104, the file break 310 is triggered by the Transfer Req 401. In response to this, the file #7 (307 (7)) at the time point when the transfer instruction has been received is brought into the completed state, and a new file #8 (307 (8)) for continuously recording the scene #3 is generated.

Then, if the total file size of the file #7 (307 (7)) and the file #8 (307 (8)) reaches the file upper limit capacity of the file format, the file break 310 occurs for the file #8 (307 (8)). In response to this, the file #8 (307 (8)) is brought into the completed state, and a new file #9 (307 (9)) for continuously recording the scene #3 is generated. As for files following the file #9 (307 (9)), if the file size of a corresponding file reaches the file upper limit capacity of the file format, the file break 310 occurs. In FIG. 8C, the file break 310 occurs for the file #9 (307 (9)). The file #9 (307 (9)) is accordingly brought into the completed state, and a new file #10 (307 (10)) for continuously recording the scene #3 is generated.

If the Rec Stop 308 is instructed, the file #10 (307 (10)) being recorded and being in the uncompleted state is completed by the file close 309 as a file.

At this time, the execution of file mergence 801 is triggered by the Rec Stop 308. In the file mergence 801, files obtained by the division performed using the file break 310 triggered by the Transfer Req 401, i.e., the file #7 (307 (7)) and the file #8 (307 (8)) in this example are merged, and a file #11 (307 (11)) is generated. This can avoid an unnecessary increase in the number of files. In addition, in this example, the merged file is renamed as the file #11 so as to be a sequential number following the last-recorded file. Nevertheless, the name of the merged file is not limited thereto. For avoiding discontinuity in file numbers, the merged file may be renamed as the file #7, and the file #9 (307 (9)) and the file #10 (307 (10)) may be respectively renamed as the file #8 and the file #9.

Figure 9A:
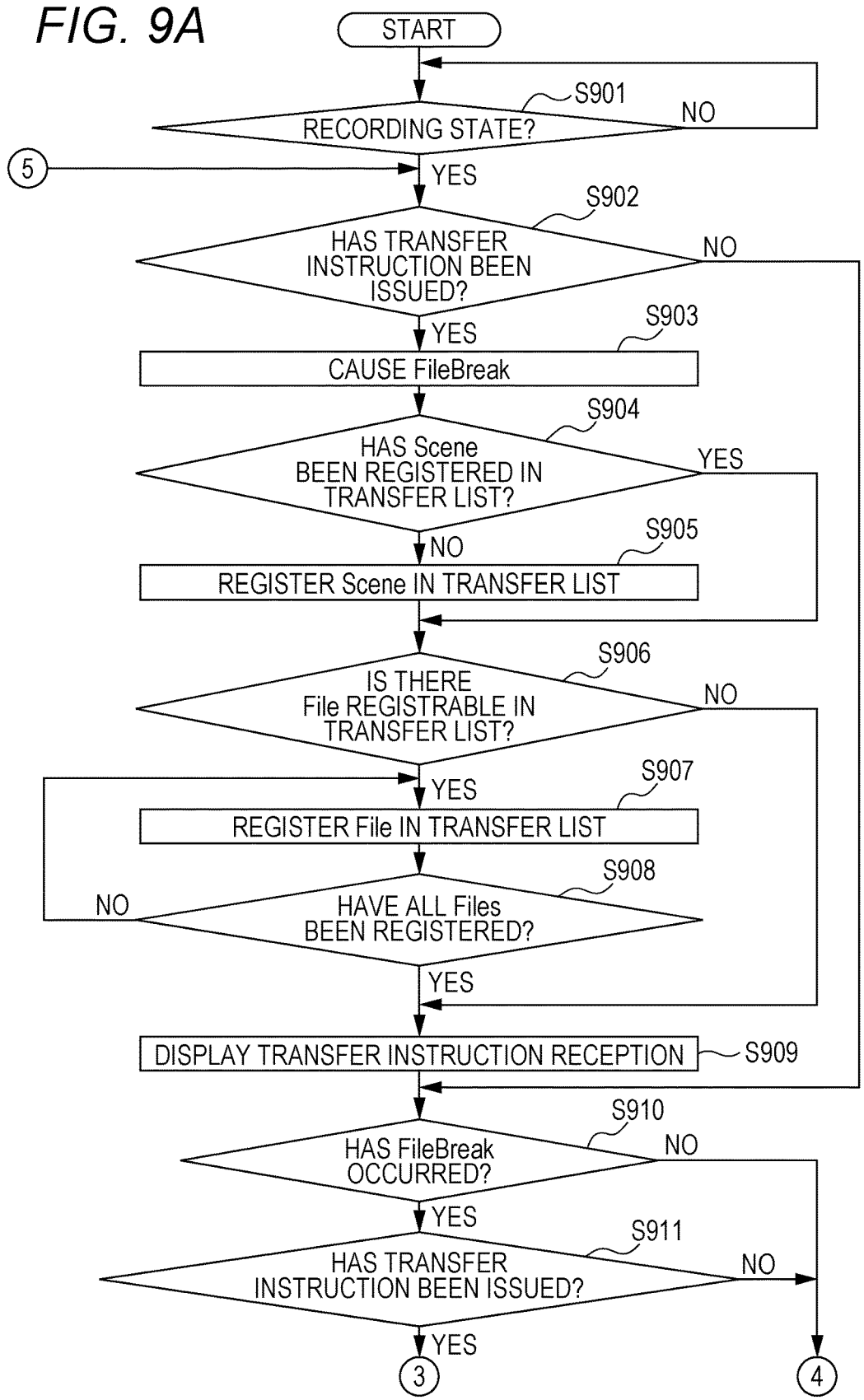
FIGS. 9A and 9B are flowcharts illustrating file generation control processing and transfer list registration processing of the video camera according to the second exemplary embodiment.
Figure 9B:
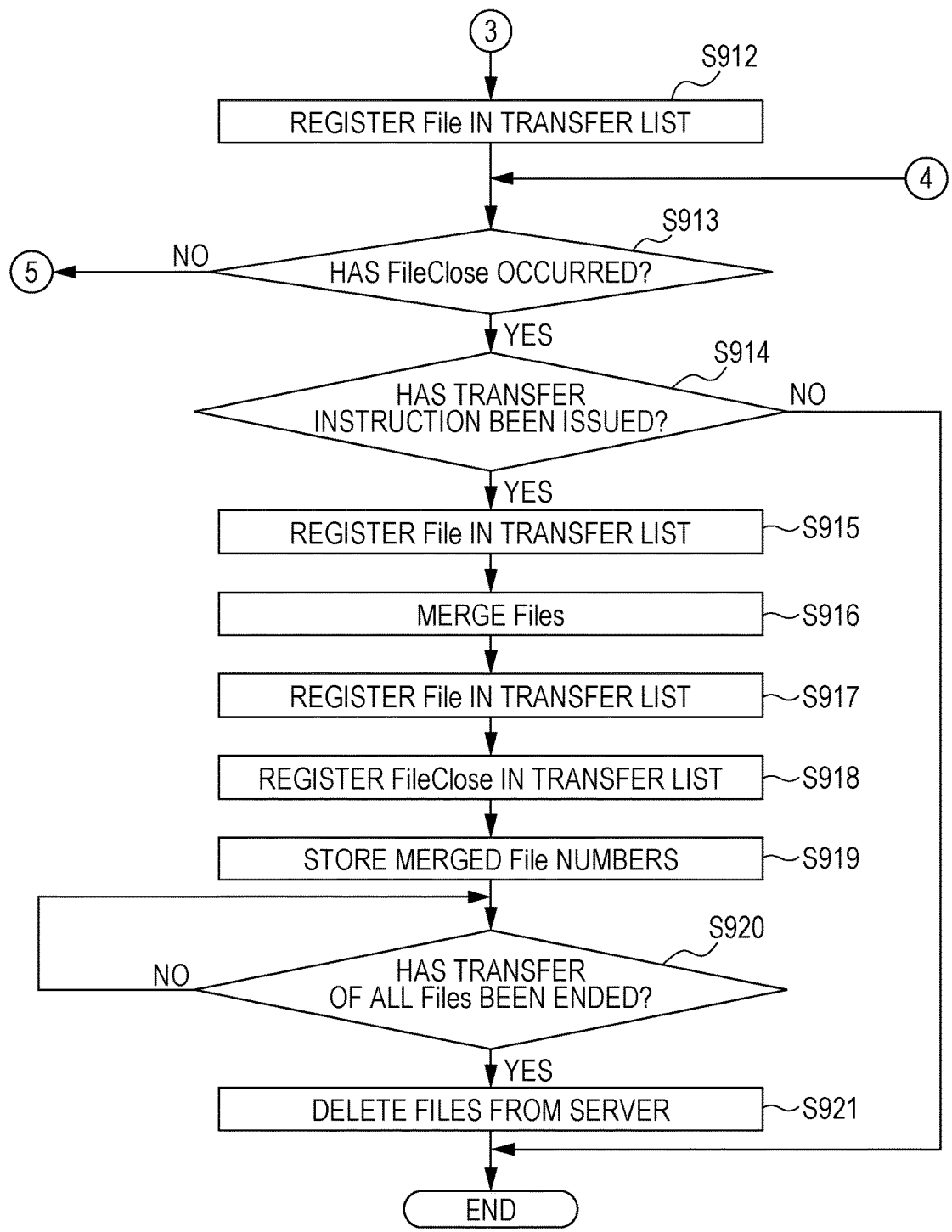

FIGS. 9A and 9B are flowcharts illustrating file generation control processing and transfer list registration processing of the video camera 100 according to the second exemplary embodiment.

If the Transfer Req 401 serving as a transfer instruction is input as illustrated in FIGS. 8A to 8C, the video camera 100 causes the file break 310 and registers the transfer list 500. According to the transfer list 500, the video camera 100 transfers a scene to the external device. In step S901, the CPU 113 checks whether the video camera 100 is in the recording state. The processing is not executed in states other than the recording state (NO in step S901), and step S901 is repeated. If the video camera 100 is in the recording state (YES in step S901), the processing proceeds to step S902.

In step S902, the CPU 113 checks whether the Transfer Req 401 has been input. If the Transfer Req 401 has not been input (NO in step S902), the processing proceeds to step S910. If the Transfer Req 401 has been input (YES in step S902), the processing proceeds to step S903.

In step S903, the CPU 113 causes the file break 310. In response to this, in FIG. 8A, the file #1 (307 (1)) at the time point when the transfer instruction has been received is brought into the completed state, and the new file #2 (307 (2)) for continuously recording the scene #1 is generated. In addition, in FIG. 8B, the file #3 (307 (3)) at the time point when the transfer instruction has been received is brought into the completed state, and the new file #4 (307 (4)) for continuously recording the scene #2 is generated. In addition, in FIG. 8C, the file #7 (307 (7)) at the time point when the transfer instruction has been received is brought into the completed state, and the new file #8 (307 (8)) for continuously recording the scene #3 is generated.

In step S904, the CPU 113 checks whether a scene being recorded is registered in the transfer list 500. If there is registration in the transfer list 500 (YES in step S904), the processing proceeds to step S906. If there is no registration in the transfer list 500 (NO in step S904), the processing proceeds to step S905.

In step S905, the CPU 113 registers a scene to be transferred, in the transfer list 500. The CPU 113 that has detected the input of the Transfer Req 401 in step S902 acquires a scene number instructed via the Transfer Req 401 to be transferred, and registers the acquired scene number in the transfer list 500.

In step S906, the CPU 113 checks whether there is a file registerable in the transfer list 500. The CPU 113 manages information of a scene currently being recorded. The scene information includes information of files constituting the scene. Based on the scene information, it can be determined whether the scene is constituted by a plurality of files using the file break 310. In FIG. 8A, since the file break 310 is caused at the time point when the Transfer Req 401 is input, the file #1 (307 (1)) enters the completed state and can be registered in the transfer list 500. The same applies to the file #3 (307 (3)) in FIG. 8B, and the file #7 (307 (7)) in FIG. 8C. In this case (YES in step S906), the processing proceeds to step S907, and the registration processing of the transfer list 500 is executed. On the other hand, if there is no file registerable in the transfer list 500 (NO in step S906), the processing proceeds to step S909.

In step S907, the CPU 113 registers a file to be transferred, in the transfer list 500. In FIG. 8A, the CPU 113 registers the file #1 (307 (1)) in the completed state, in the transfer list 500. In addition, in FIG. 8B, the CPU 113 registers the file #3 (307 (3)) in the completed state, in the transfer list 500. In addition, in FIG. 8C, the CPU 113 registers the file #7 (307 (7)) in the completed state, in the transfer list 500.

In step S908, the CPU 113 checks whether all registerable files have been registered in the transfer list 500. In FIGS. 8A to 8C, no other file to be registered in the transfer list 500 exists. If there is a file to be registered (NO in step S908), the processing returns to step S907. If the registration of all the files has been ended (YES in step S908), the processing proceeds to step S909.

In step S909, the CPU 113 notifies, using the display unit 112, the user that the registration in the transfer list 500 has been performed in response to the Transfer Req 401. If the display is ended, the processing proceeds to step S910.

In step S910, the CPU 113 checks whether the file break 310 has occurred for the files included in the scene being recorded. If the file size of a file to be recorded on the recording medium 104 reaches a file upper limit capacity of the file format, the file is divided according to the control of the CPU 113. In FIG. 8B, if the total file size of the file #3 (307 (3)) and the file #4 (307 (4)) reaches the file upper limit capacity of the file format, the file break 310 occurs for the file #4 (307 (4)). As for subsequent files, if the file size of a corresponding file reaches the file upper limit capacity of the file format, the file break 310 occurs. In addition, in FIG. 8C, if the total file size of the file #7 (307 (7)) and the file #8 (307 (8)) reaches the file upper limit capacity of the file format, the file break 310 occurs for the file #8 (307 (8)). As for subsequent files, if the file size of a corresponding file reaches the file upper limit capacity of the file format, the file break 310 occurs. If the file break 310 has been detected (YES in step S910), the processing proceeds to step S911. If the file break 310 has not been detected (NO in step S910), the processing proceeds to step S913.

In step S911, the CPU 113 checks whether the Transfer Req 401 has been input. If the Transfer Req 401 has not been input (NO in step S911), the processing proceeds to step S913. If the Transfer Req 401 has been input (YES in step S911), the processing proceeds to step S912.

In step S912, the CPU 113 updates the transfer list 500. In FIG. 8B, the CPU 113 registers the file #4 (307 (4)) and the file #5 (307 (5)) in the transfer list 500. In addition, in FIG. 8C, the CPU 113 registers the file #9 (307 (9)) in the transfer list 500.

In step S913, the CPU 113 checks whether the file close 309 has occurred for the scene being recorded. The CPU 113 performs file close if the Rec Stop 308 is input via the operation unit 106. In FIG. 8A, the file #2 (307 (2)) is brought into the completed state by the file close 309, and becomes registerable in the transfer list 500. In addition, in FIG. 8B, the file #6 (307 (6)) is brought into the completed state by the file close 309, and becomes registerable in the transfer list 500. In addition, in FIG. 8C, the file #10 (307 (10)) is brought into the completed state by the file close 309, and becomes registerable in the transfer list 500. If the file close 309 has been detected (YES in step S913), the processing proceeds to step S914. If the file close 309 has not been detected (NO in step S913), the processing returns to step S902.

In step S914, the CPU 113 checks whether the Transfer Req 401 has been input. If the Transfer Req 401 has not been input (NO in step S914), the processing is ended. If the Transfer Req 401 has been input (YES in step S914), the processing proceeds to step S915.

In step S915, the CPU 113 updates the transfer list 500. In FIG. 8A, the CPU 113 registers the file #2 (307 (2)) that has been brought into the completed state by the file close 309, in the transfer list 500. In addition, in FIG. 8B, the CPU 113 registers the file #6 (307 (6)) that has been brought into the completed state by the file close 309, in the transfer list 500. In addition, in FIG. 8C, the CPU 113 registers the file #10 (307 (10)) that has been brought into the completed state by the file close 309, in the transfer list 500.

In step S916, the CPU 113 merges files obtained by the file break caused according to the Transfer Req 401. In FIG. 8C, the CPU 113 generates a file by merging the file #7 (307 (7)) and the file #8 (307 (8)). For example, the merged file is renamed as the file #11 (307 (11)) so as to be a sequential number following the last-recorded file.

In step S917, the CPU 113 updates the transfer list 500. In FIG. 8C, the CPU 113 registers the file #11 (307 (11)) obtained by the mergence in step S916, in the transfer list 500.

In step S918, the CPU 113 performs file close registration for writing data indicating scene completion, in the transfer list 500. After detecting the file close 309 and registering the file in the transfer list 500, the CPU 113 registers the completion of the scene in the transfer list 500.

In step S919, the CPU 113 stores the numbers of the merged files into the RAM 109. In FIG. 8C, the numbers #7 and #8 of the file #7 and the File #8 are stored. In addition, an example of the numbers of files has been described here. Nevertheless, other items may be stored instead of the numbers as long as the files can be identified.

In step S920, the CPU 113 checks whether all the files registered in the transfer list 500 have been transferred. The transfer processing performed according to the transfer list 500 is as described in the first exemplary embodiment, and is performed asynchronously with the processing in this flowchart. If all the files registered in the transfer list 500 have been transferred (YES in step S920), the processing proceeds to step S921.

In step S921, the CPU 113 deletes the files corresponding to the file numbers stored in step S919, from a transfer destination FTP server.

In the present exemplary embodiment, the processing in steps S916 to S921 is performed for ensuring the consistency between the structure of files recorded on the recording medium 104 of the video camera 100 and the structure of files in the transfer destination FTP server. Nevertheless, the CPU 113 does not necessarily have to perform the deletion processing step S921. For example, if the CPU 113 does not perform the deletion processing in step S921, the CPU 113 may perform processing of transmitting information about the mergence to the FTP server as meta-information.

Third Exemplary Embodiment

Next, a third exemplary embodiment will be described. In addition, the configuration and basic operations of a video camera 100 are the same as those described in the first and second exemplary embodiments. The following description will be given mainly of a difference from the first and second exemplary embodiments.

Figure 10:
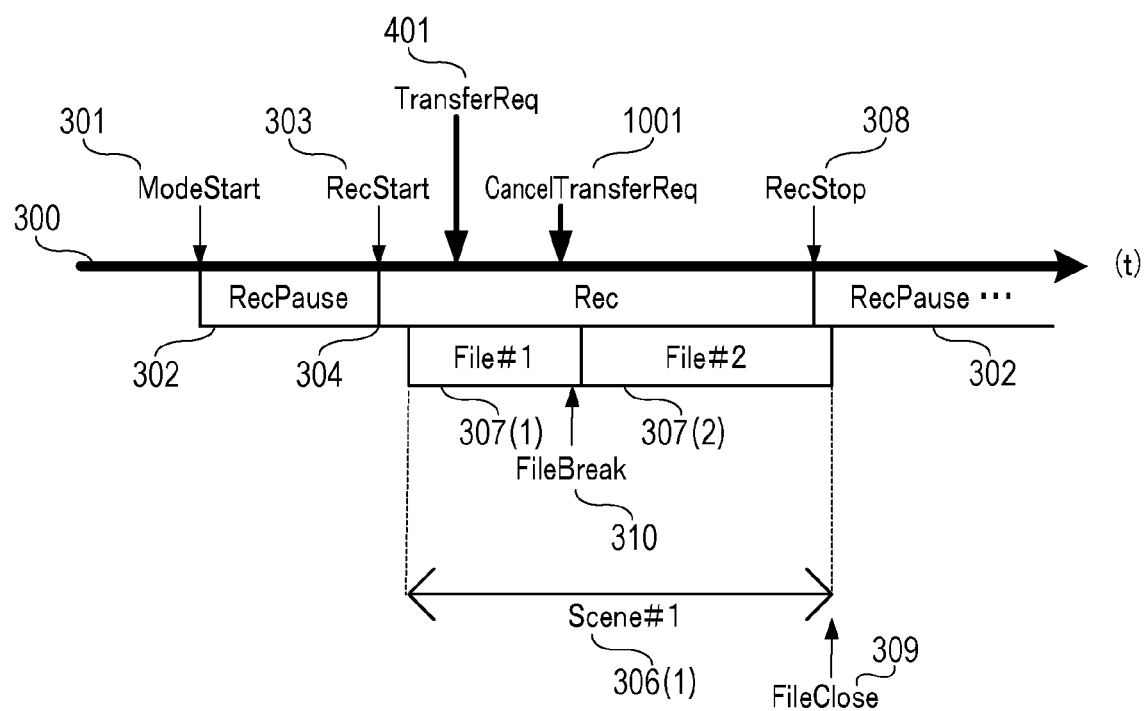
FIG. 10 is a diagram illustrating an example of a relationship between a recording operation, scenes, files, and a transfer instruction in a video camera according to a third exemplary embodiment.

FIG. 10 is a diagram illustrating an example of a relationship between a recording operation, scenes, files, and a transfer instruction in the video camera 100 according to the third exemplary embodiment.

FIG. 10 illustrates a state in which a transfer instruction has been issued so as to transfer a scene being recorded, to an external device, in the recording state (the Rec 304) of the video camera 100.

A scene #1 (306 (1)) is assumed to be initially recorded onto the recording medium 104, and has an allocated number "#1".

Similarly to the scene #1 (306 (1)), a file #1 (307 (1)) is assumed to be initially recorded onto the recording medium 104, and has an allocated number "#1".

Transfer Req 401 indicates an input operation performed via the operation unit 106 for instructing the transfer of the scene #1 (306 (1)) being recorded, to the external device.

Cancel Transfer Req 1001 indicates an input operation performed via the operation unit 106 for instructing the transfer stop of the scene #1 (306 (1)) being recorded and instructed via the Transfer Req 401 to be transferred.

In this case, for setting up to the file #1 (307 (1)) being recorded on the recording medium 104, as a transfer target, and stopping the transfer of subsequent files, the file break 310 is triggered by the Cancel Transfer Req 1001. In response to this, the file #1 (307 (1)) at the time point when a transfer stop instruction has been received is brought into the completed state, and a new file #2 (307 (2)) for continuously recording the scene #1 is generated. Since the transfer stop instruction has been issued for the file #2 (307 (2)), even if the file close 309 occurs for the file #2 (307 (2)) thereafter, the file #2 (307 (2)) is not registered in the transfer list 500.

If the Rec Stop 308 is instructed, the file #2 (307 (2)) being recorded and being in the uncompleted state is completed by the file close 309 as a file.

In addition, the file break 310 that occurs for files following the file #2 (307 (2)), and file mergence performed after the Rec Stop 308 are similar to the processing in the second exemplary embodiment. Thus, the description thereof will be omitted.

Figure 11A:
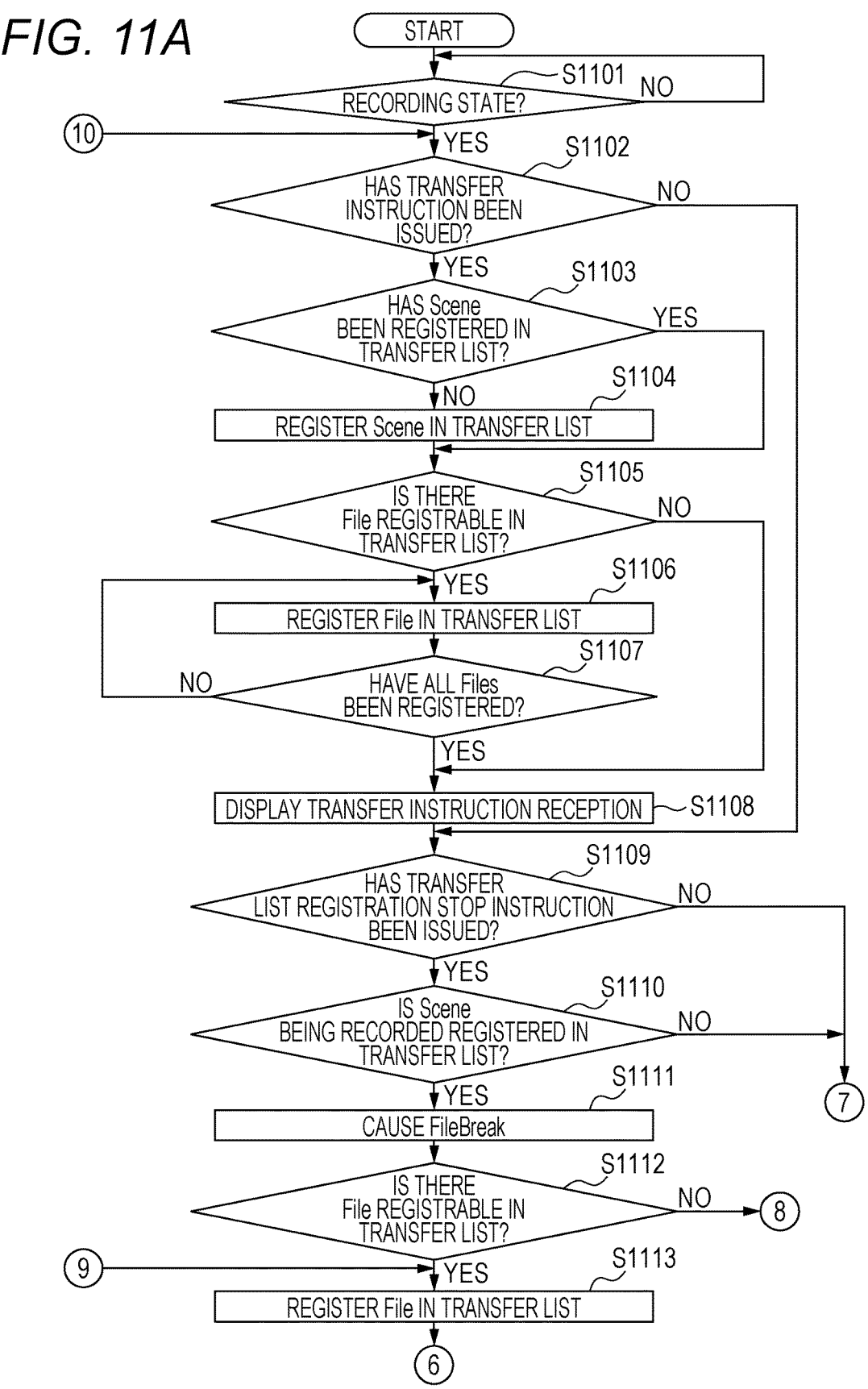
FIGS. 11A and 11B are flowcharts illustrating file generation control processing and transfer list registration processing of the video camera according to the third exemplary embodiment.
Figure 11B:
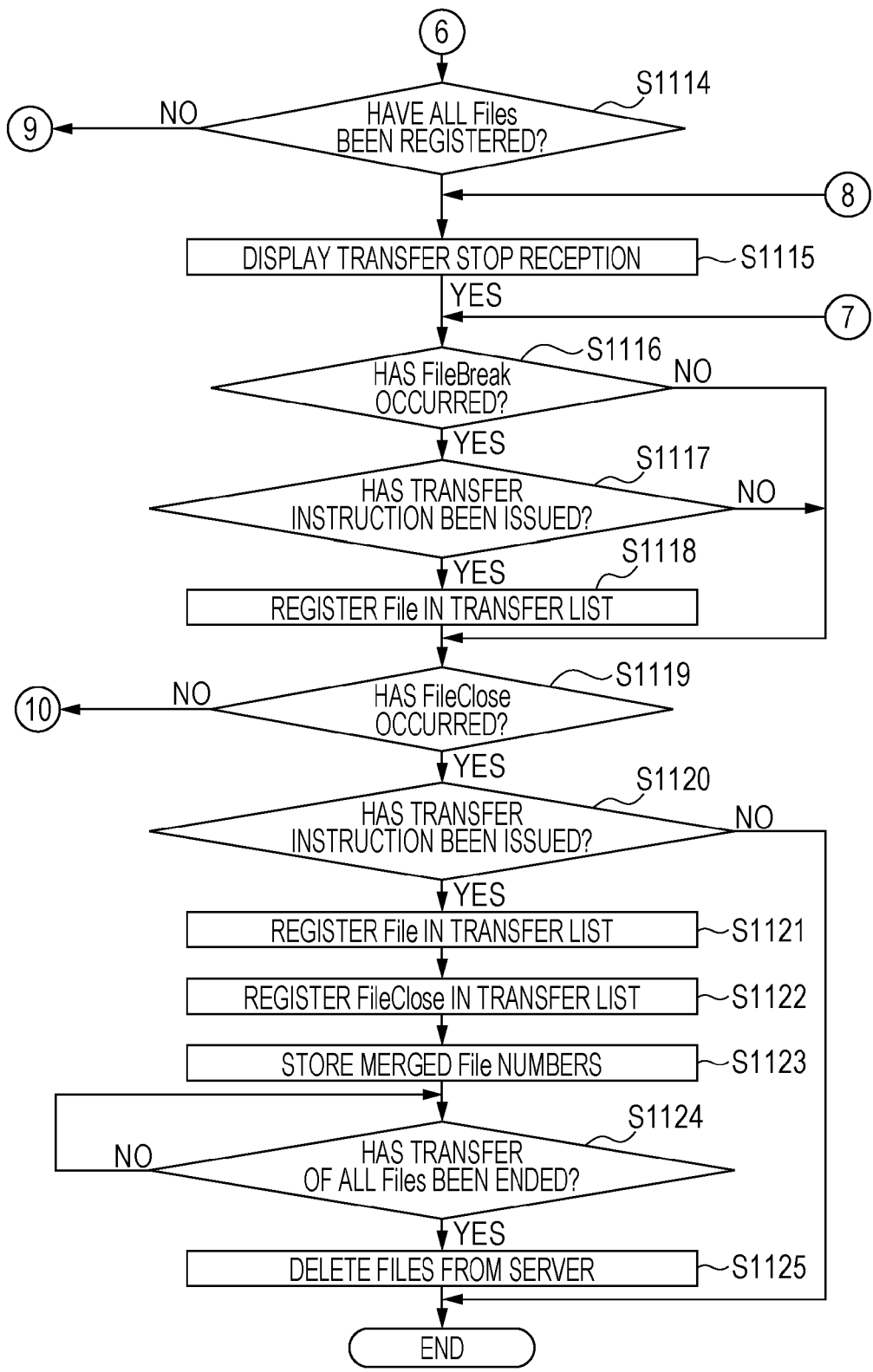

FIGS. 11A and 11B are flowcharts illustrating file generation control processing and transfer list registration processing of the video camera 100 according to the third exemplary embodiment.

If the Cancel Transfer Req 1001 serving as a transfer stop instruction is input as illustrated in FIG. 10, the video camera 100 causes the file break 310 and registers the transfer list 500. According to the transfer list 500, the video camera 100 transfers a scene to the external device.

In step S1101, the CPU 113 checks whether the video camera 100 is in the recording state. The processing is not executed in states other than the recording state (NO in step S1101), and step S1101 is repeated. If the video camera 100 is in the recording state (YES in step S1101), the processing proceeds to step S1102.

In step S1102, the CPU 113 checks whether the Transfer Req 401 has been input. If the Transfer Req 401 has not been input (NO in step S1102), the processing proceeds to step S1109. If the Transfer Req 401 has been input (YES in step S1102), the processing proceeds to step S1103.

In step S1103, the CPU 113 checks whether a scene being recorded is registered in the transfer list 500. If there is registration in the transfer list 500 (YES in step S1103), the processing proceeds to step S1105. If there is no registration in the transfer list 500 (NO in step S1103), the processing proceeds to step S1104.

In step S1104, the CPU 113 registers a scene to be transferred, in the transfer list 500. The CPU 113 that has detected the input of the Transfer Req 401 in step S1102 acquires a scene number instructed via the Transfer Req 401 to be transferred, and registers the acquired scene number in the transfer list 500.

In step S1105, the CPU 113 checks whether there is a file registerable in the transfer list 500. The CPU 113 manages information of a scene currently being recorded. The scene information includes information of files constituting the scene. Based on the scene information, it can be determined whether the scene is constituted by a plurality of files using the file break 310. In FIG. 10, at the time point when the Transfer Req 401 is input, the file #1 (307 (1)) is in the uncompleted state and cannot be registered in the transfer list 500. In this case (NO in step S1105), the processing proceeds to step S1108, and the registration processing of the transfer list 500 is executed. On the other hand, if there is a file registerable in the transfer list 500 (YES in step S1105), the processing proceeds to step S1106.

In step S1106, the CPU 113 registers a file to be transferred, in the transfer list 500.

In step S1107, the CPU 113 checks whether all registerable files have been registered in the transfer list 500. If there is a file to be registered (NO in step S1107), the processing returns to step S1106. If the registration of all the files has been ended (YES in step S1107), the processing proceeds to step S1108.

In step S1108, the CPU 113 notifies, using the display unit 112, the user that the registration in the transfer list 500 has been performed in response to the Transfer Req 401. If the display is ended, the processing proceeds to step S1109.

In step S1109, the CPU 113 checks whether the Cancel Transfer Req 1001 has been input. If the Cancel Transfer Req 1001 has not been input (NO in step S1109), the processing proceeds to step S1116. If the Cancel Transfer Req 1001 has been input (YES in step S1109), the processing proceeds to step S1110.

In step S1110, the CPU 113 checks whether a scene being recorded is registered in the transfer list 500. In FIG. 10, the CPU 113 checks whether the scene #1 (306 (1)) is registered in the transfer list 500. If the scene is not registered (NO in step S1110), the processing proceeds to step S1116. If the scene is registered (YES in step S1110), the processing proceeds to step S1111.

In step S1111, the CPU 113 causes the file break 310. In response to this, in FIG. 10, the file #1 (307 (1)) at the time point when the transfer stop instruction has been received is brought into the completed state, and the new file #2 (307 (2)) for continuously recording the scene #1 is generated.

In step S1112, the CPU 113 checks whether there is a file registerable in the transfer list 500. The CPU 113 manages information of a scene currently being recorded. The scene information includes information of files constituting the scene. Based on the scene information, it can be determined whether the scene is constituted by a plurality of files using the file break 310. In FIG. 10, since the file break 310 is caused at the time point when the Cancel Transfer Req 1001 is input, the file #1 (307 (1)) enters the completed state and can be registered in the transfer list 500. In this case (YES in step S1112), the processing proceeds to step S1113, and the registration processing of the transfer list 500 is executed. On the other hand, if there is no file registerable in the transfer list 500 (NO in step S1112), the processing proceeds to step S1115.

In step S1113, the CPU 113 registers a file to be transferred, in the transfer list 500. In FIG. 10, the CPU 113 registers the file #1 (307 (1)) in the completed state, in the transfer list 500.

In step S1114, the CPU 113 checks whether all registerable files have been registered in the transfer list 500. In FIG. 10, no other file to be registered in the transfer list 500 exists. If there is a file to be registered (NO in step S1114), the processing returns to step S1113. If the registration of all the files has been ended (YES in step S1114), the processing proceeds to step S1115.

In step S1115, the CPU 113 notifies, using the display unit 112, the user that the registration in the transfer list 500 has been cancelled in response to the Cancel Transfer Req 1001. If the display is ended, the processing proceeds to step S1116.

In step S1116, the CPU 113 checks whether the file break 310 has occurred for the files included in the scene being recorded. If the file size of a file to be recorded on the recording medium 104 reaches a file upper limit capacity of the file format, the file is divided according to the control of the CPU 113. If the file break 310 has been detected (YES in step S1116), the processing proceeds to step S1117. If the file break 310 has not been detected (NO in step S1116), the processing proceeds to step S1119.

In step S1117, the CPU 113 checks whether the Transfer Req 401 has been input. The input in this step means that the registration in the transfer list 500 has not been cancelled in response to the Cancel Transfer Req 1001. If the Transfer Req 401 has not been input (NO in step S1117), the processing proceeds to step S1119. If the Transfer Req 401 has been input (YES in step S1117), the processing proceeds to step S1118.

In step S1118, the CPU 113 updates the transfer list 500.

In step S1119, the CPU 113 checks whether the file close 309 has occurred for the scene being recorded. The CPU 113 performs file close if the Rec Stop 308 is input via the operation unit 106. In FIG. 10, the file #2 (307 (2)) is brought into the completed state by the file close 309, and becomes registerable in the transfer list 500. If the file close 309 has been detected (YES in step S1119), the processing proceeds to step S1120. If the file close 309 has not been detected (NO in step S1119), the processing returns to step S1102.

In step S1120, the CPU 113 checks whether the Transfer Req 401 has been input. The input in this step means that the registration in the transfer list 500 has not been cancelled in response to the Cancel Transfer Req 1001. If the Transfer Req 401 has not been input (NO in step S1120), the processing is ended. If the Transfer Req 401 has been input (YES in step S1120), the processing proceeds to step S1121.

In step S1121, the CPU 113 updates the transfer list 500. In FIG. 10, the CPU 113 registers the file (307 (2)) that has been brought into the completed state by the file close 309, in the transfer list 500.

In step S1122, the CPU 113 performs file close registration for writing data indicating scene completion, in the transfer list 500. After detecting the file close 309 and registering the file in the transfer list 500, the CPU 113 registers the completion of the scene in the transfer list 500.

In step S1123, the CPU 113 stores the numbers of the merged files into the RAM 109.

In step S1124, the CPU 113 checks whether all the files registered in the transfer list 500 have been transferred. The transfer processing performed according to the transfer list 500 is as described in the first exemplary embodiment, and is performed asynchronously with the processing in this flowchart. If all the files registered in the transfer list 500 have been transferred (YES in step S1124), the processing proceeds to step S1125.

In step S1125, the CPU 113 deletes the files corresponding to the file numbers stored in step S1123, from a transfer destination FTP server.

In the present exemplary embodiment, the processing in steps S1122 to S1125 is performed for ensuring the consistency between the structure of files recorded on the recording medium 104 of the video camera 100 and the structure of files in the transfer destination FTP server. Nevertheless, the CPU 113 does not necessarily have to perform the deletion processing step S1125. For example, if the CPU 113 does not perform the deletion processing in step S1125, the CPU 113 may perform processing of transmitting information about the mergence to the FTP server as meta-information.

In addition, in the third exemplary embodiment, the description has been given of the configuration in which the file break 310 is not triggered by the Transfer Req 401. Nevertheless, as in the second exemplary embodiment, the file break 310 may be triggered by the Transfer Req 401.

Fourth Exemplary Embodiment

In a fourth exemplary embodiment, the description will be given of an example in which a video camera 100 records high image quality video data on a recording medium A104 (hereinafter, referred to as main recording), and simultaneously records video data with lower bit rate than that of the main recording on a recording medium B117 (hereinafter, referred to as proxy recording).

In addition, the configuration and basic operations of the video camera 100 are the same as those described in the first exemplary embodiment. The following description will be given mainly of a difference from the first exemplary embodiment.

A recording mode can be switched using the operation unit 106 to a simultaneous recording mode in which the main recording is performed on the recording medium A104 and the proxy recording is performed on the recording medium B117. In the simultaneous recording mode, 2 types of recording data, i.e., main recording data and proxy recording data are simultaneously output from the CODEC 110, and then, the main recording data is recorded on the recording medium A104 and the proxy recording data is recorded on the recording medium B117.

Figure 12A:
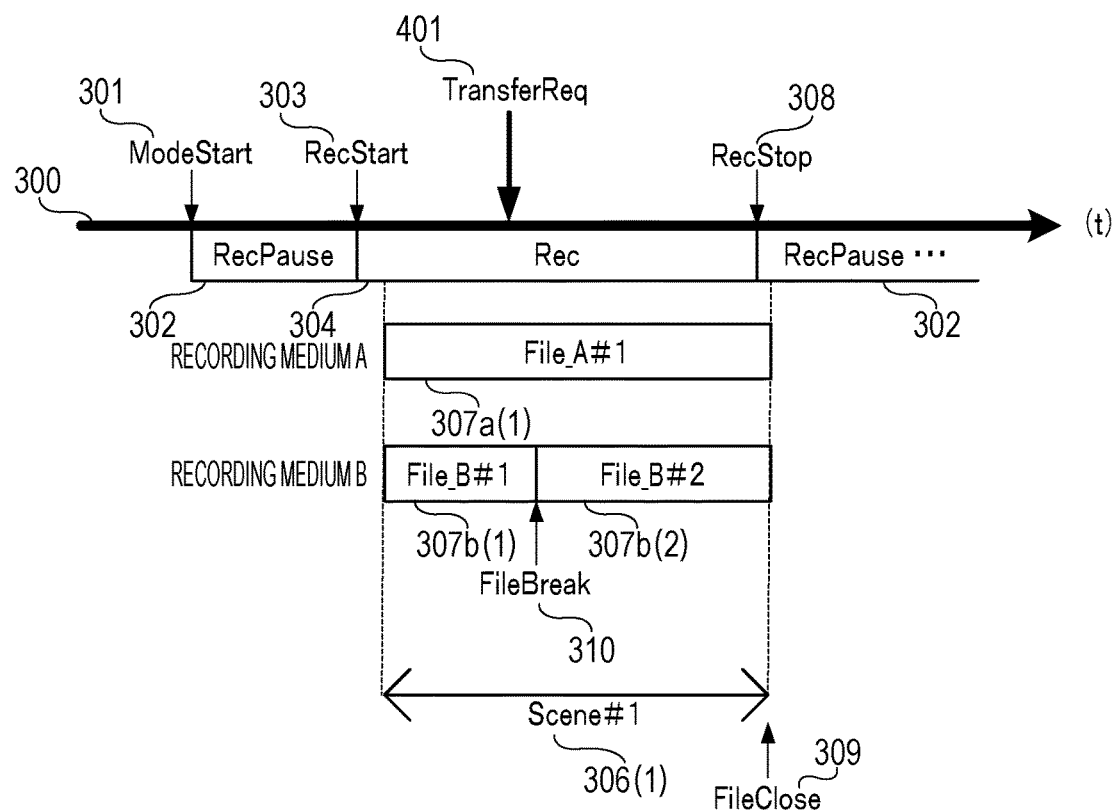
FIGS. 12A and 12B are diagrams illustrating an example of a relationship between a recording operation, scenes, files, and a transfer instruction in a video camera according to a fourth exemplary embodiment.
Figure 12B:
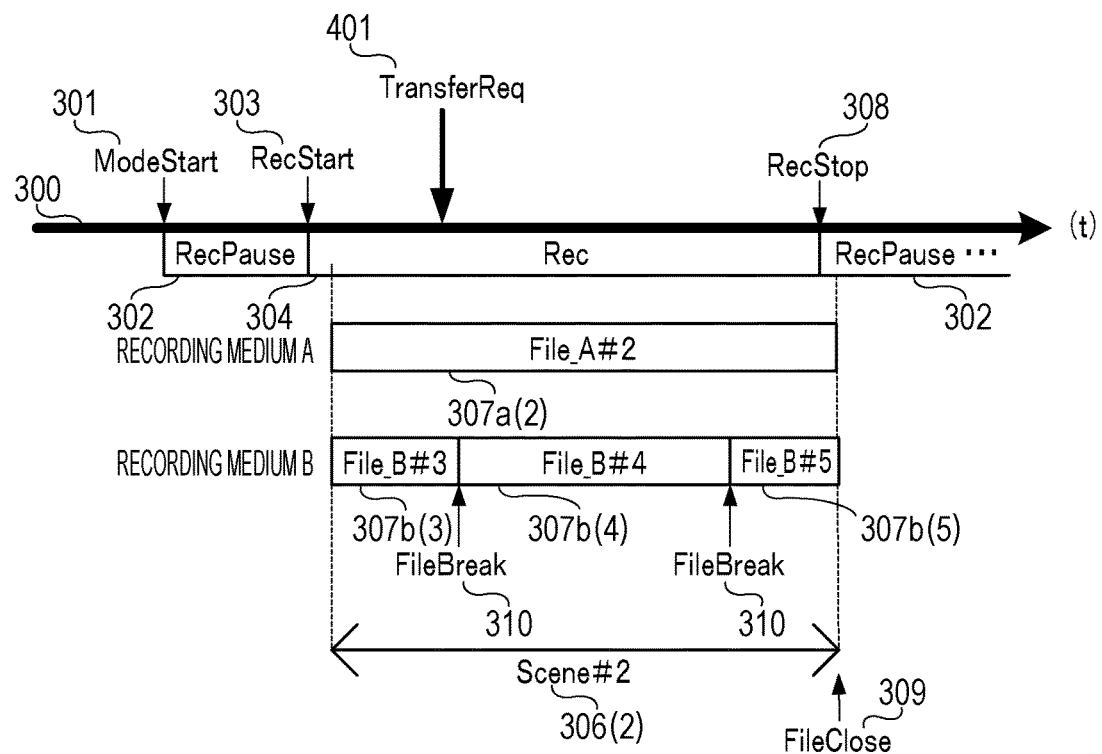

FIGS. 12A and 12B are diagrams illustrating an example of a relationship between a recording operation, scenes, files, and a transfer instruction in the video camera 100 according to the fourth exemplary embodiment. A file to be recorded on the recording medium A104 is set as a file_A and a file to be recorded on the recording medium B117 is set as a file_B. FIG. 12A illustrates a state in which a transfer instruction has been issued so as to transfer a scene being recorded, to an external device, in the recording state (the Rec 304) of the video camera 100.

A scene #1 (306 (1)) is assumed to be initially recorded onto the recording medium A104, and has an allocated number "#1".

Similarly to the scene #1 (306 (1)), a file_A#1 (307a (1)) is assumed to be initially recorded onto the recording medium A104, and has an allocated number "#1". In addition, similarly to the scene #1 (306 (1)), a file_B#1 (307b (1)) is assumed to be initially recorded onto the recording medium B117, and has an allocated number "#1".

Transfer Req 401 indicates an input operation performed via the operation unit 106 for instructing the transfer of the scene #1 (306 (1)) being recorded, to the external device.

In this case, for promptly transferring the file_B#1 (307b (1)) being recorded on the recording medium B117, the file break 310 is triggered by the Transfer Req 401. In response to this, the file_B#1 (307b (1)) at the time point when the transfer instruction has been received is brought into the completed state, and a new file_B#2 (307b (2)) for continuously recording the scene #1 is generated. On the other hand, the file_A#1 (307a (1)) being recorded on the recording medium A104 continues to be recorded without the file break 310.

If the Rec Stop 308 is instructed, the file_A#1 (307a (1)) and the file_B#2 (307b (2)) being recorded and being in the uncompleted state are completed by the file close 309 as files.

FIG. 12B illustrates a state in which a transfer instruction has been issued so as to transfer a scene being recorded, to the external device, in the recording state (the Rec 304) of the video camera 100.

A scene #2 (306 (2)) is assumed to be a scene started to be recorded upon the second Rec Start 303 being instructed, and has an allocated number "#2".

Similarly to the scene #2 (306 (2)), a file_A#2 (307a (2)) is assumed to be a file to be secondly recorded onto the recording medium A104, and has an allocated number "#2". In addition, a file_B#3 (307b (3)) is assumed to be a file to be thirdly recorded onto the recording medium B117, and has an allocated number "#3".

The Transfer Req 401 indicates an input operation performed via the operation unit 106 for instructing the transfer of the scene #2 (306 (2)) being recorded, to the external device.

In this case, for promptly transferring the file_B#3 (307b (3)) being recorded on the recording medium B117, the file break 310 is triggered by the Transfer Req 401. In response to this, the file_B#3 (307b (3)) at the time point when the transfer instruction has been received is brought into the completed state, and a new file_B#4 (307b (4)) for continuously recording the scene #2 is generated. In FIG. 12B, the file break 310 further occurs for the file_B#4 (307b (4)). The file_B#4 (307b (4)) is accordingly brought into the completed state, and a new file_B#5 (307b (5)) for continuously recording the scene #2 is generated. On the other hand, the file_A#2 (307a (2)) being recorded on the recording medium A104 continues to be recorded without the file break 310.

Here, for example, suppose that the file break 310 is caused upon the size of a file_B reaching a predetermined file size in the recording medium B117. In this case, after the file break 310 is triggered by the Transfer Req 401, the predetermined file size is changed to a small size. Normally, the file break is executed upon a file size reaching an upper limit capacity of a file system of a recording medium on which the file is being recorded. For example, if the file system of the recording medium is the File Allocation Table32 (FAT32), the upper limit capacity is 4 GB. Thus, the file break is executed so that the file size becomes a size not exceeding 4 GB. In the present exemplary embodiment, if the file break is executed so that the file size becomes a size not exceeding 4 GB, after the file break 310 is triggered by the Transfer Req 401, the file break 310 is caused so that the file size becomes a size not exceeding 1 GB, and files following the file_B#4 (307b (4)) are completed.

In addition, the file break 310 may be caused upon a record time of a file reaching a predetermined time, instead of the file size reaching the predetermined file size. Normally, the file break is executed upon the lapse of an arbitrary time due to restrictions on the file format of a file being recorded, and the like. For example, if the restrictions on the file format are set so that the recording up to 1 hour is allowed, the file break is executed at a timing not exceeding 1 hour. Also in this case, after the file break 310 is triggered by the Transfer Req 401, the predetermined time is changed to a time shorter than 1 hour.

Figure 13A:
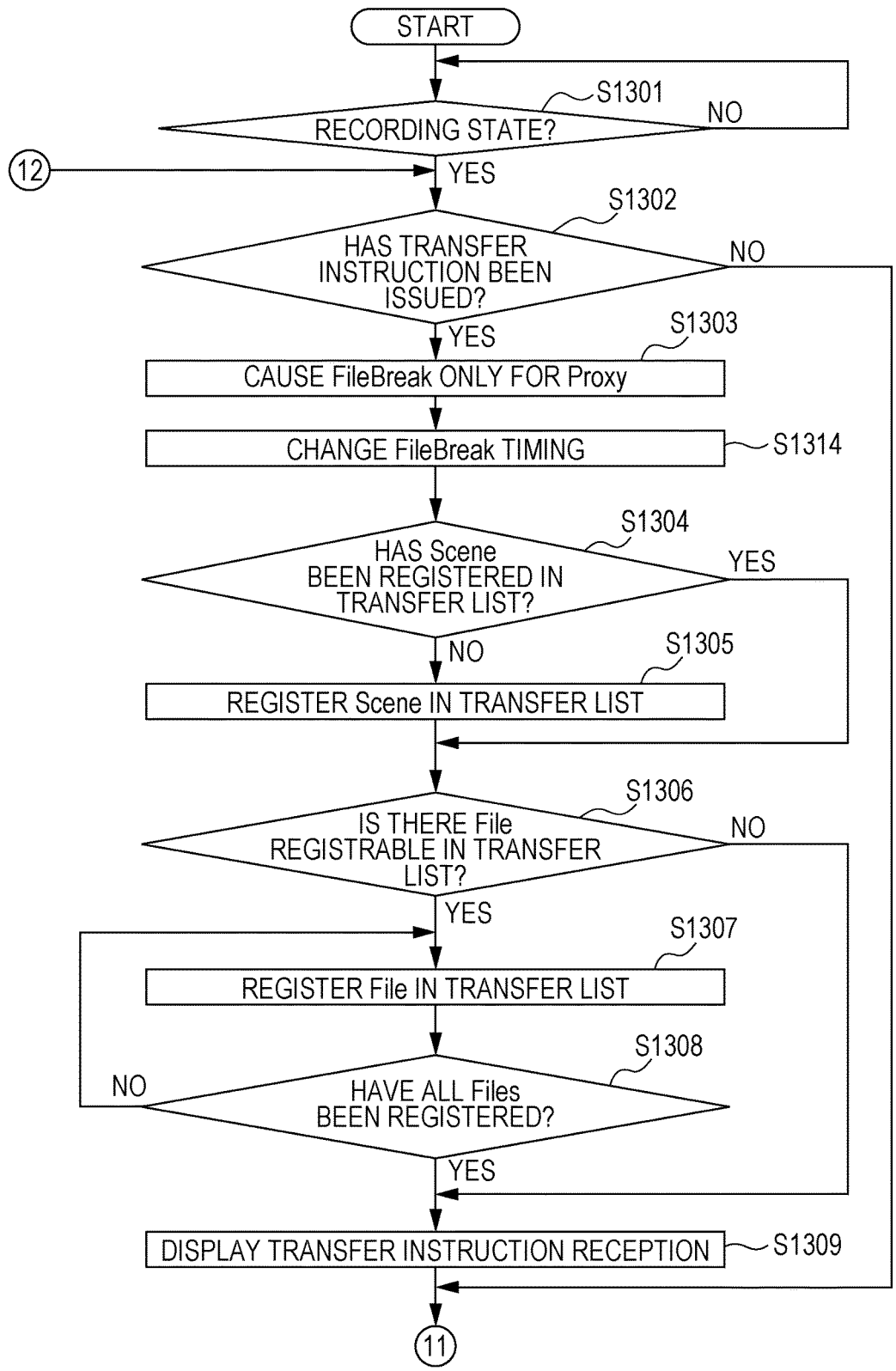

FIGS. 13A and 13B are flowcharts illustrating file generation control processing and transfer list registration processing of the video camera 100 according to the fourth exemplary embodiment.

If the Transfer Req 401 serving as a transfer instruction is input as illustrated in FIGS. 12A and 12B, the video camera 100 causes the file break 310 and registers the transfer list 500. According to the transfer list 500, the video camera 100 transfers a scene to the external device.

In step S1301, the CPU 113 checks whether the video camera 100 is in the recording state. The processing is not executed in states other than the recording state (NO in step S1301), and step S1301 is repeated. If the video camera 100 is in the recording state (YES in step S1301), the processing proceeds to step S1302.

In step S1302, the CPU 113 checks whether the Transfer Req 401 has been input. If the Transfer Req 401 has not been input (NO in step S1302), the processing proceeds to step S1310. If the Transfer Req 401 has been input (YES in step S1302), the processing proceeds to step S1303.

In step S1303, the CPU 113 causes the file break 310 for the proxy recording performed on the recording medium B117. In response to this, in FIG. 12A, the file_B#1 (307b (1)) at the time point when the transfer instruction has been received is brought into the completed state, and the new file_B#2 (307b (2)) for continuously recording the scene #1 is generated. In addition, in FIG. 12B, the file_B#3 (307b (3)) at the time point when the transfer instruction has been received is brought into the completed state, and the new file_B#4 (307b (4)) for continuously recording the scene #2 is generated.

In step S1314, the CPU 113 changes the timing of the file break. In the present exemplary embodiment, as already described, after the file break 310 is triggered by the Transfer Req 401, the file break 310 is caused so that the file size becomes a size not exceeding 1 GB.

In step S1304, the CPU 113 checks whether a scene being recorded is registered in the transfer list 500. If there is registration in the transfer list 500 (YES in step S1304), the processing proceeds to step S1306. If there is no registration in the transfer list 500 (NO in step S1304), the processing proceeds to step S1305.

In step S1305, the CPU 113 registers a scene to be transferred, in the transfer list 500. The CPU 113 that has detected the input of the Transfer Req 401 in step S1302 acquires a scene number instructed via the Transfer Req 401 to be transferred, and registers the acquired scene number in the transfer list 500.

In step S1306, the CPU 113 checks whether there is a file registerable in the transfer list 500. The CPU 113 manages information of a scene currently being recorded. The scene information includes information of files constituting the scene. Based on the scene information, it can be determined whether the scene is constituted by a plurality of files using the file break 310. In FIG. 12A, since the file break 310 is caused at the time point when the Transfer Req 401 is input, the file_B#1 (307b (1)) enters the completed state and can be registered in the transfer list 500. The same applies to the file_B#3 (307b (3)) in FIG. 12B. In this case (YES in step S1306), the processing proceeds to step S1307, and the registration processing of the transfer list 500 is executed. On the other hand, if there is no file registerable in the transfer list 500 (NO in step S1306), the processing proceeds to step S1309.

In step S1307, the CPU 113 registers a file to be transferred, in the transfer list 500. In FIG. 12A, the CPU 113 registers the file_B#1 (307b (1)) in the completed state, in the transfer list 500. In addition, in FIG. 12B, the CPU 113 registers the file_B#3 (307b (3)) in the completed state, in the transfer list 500.

In step S1308, the CPU 113 checks whether all registerable files have been registered in the transfer list 500. In FIGS. 12A and 12B, no other file to be registered in the transfer list 500 exists. If there is a file to be registered (NO in step S1308), the processing returns to step S1307. If the registration of all the files has been ended (YES in step S1308), the processing proceeds to step S1309.

In step S1309, the CPU 113 notifies, using the display unit 112, the user that the registration in the transfer list 500 has been performed in response to the Transfer Req 401. If the display is ended, the processing proceeds to step S1310.

In step S1310, the CPU 113 checks whether the file break 310 has occurred for the files included in the scene being recorded. In FIGS. 12A and 12B, after the generation of the file_B#2 (307b (2)) and the file_B#4 (307b (4)) is triggered by the Transfer Req 401, as illustrated in FIG. 12B, the file break 310 occurs upon the file size of the file_B#4 (307b (4)) reaching 1 GB. If the file break 310 has been detected (YES in step S1310), the processing proceeds to step S1311. If the file break 310 has not been detected (NO in step S1310), the processing proceeds to step S1313.

In step S1311, the CPU 113 checks whether the Transfer Req 401 has been input. If the Transfer Req 401 has not been input (NO in step S1311), the processing proceeds to step S1313. If the Transfer Req 401 has been input (YES in step S1311), the processing proceeds to step S1312.

In step S1312, the CPU 113 updates the transfer list 500. In FIG. 12B, the CPU 113 that has detected the file break 310 registers the file #4 (307 (4)) in the transfer list 500.

In step S1313, the CPU 113 checks whether the file close 309 has occurred for the scene being recorded. The CPU 113 performs file close if the Rec Stop 308 is input via the operation unit 106. In FIG. 12A, the file_A#1 (307a (1)) and the file_B#2 (307b (2)) are brought into the completed state by the file close 309, and the file_B#2 (307b (2)) becomes registerable in the transfer list 500. In addition, in FIG. 12B, the file_A#2 (307a (2)) and the file_B#5 (307b (5)) are brought into the completed state by the file close 309, and the file_B#5 (307b (5)) becomes registerable in the transfer list 500. If the file close 309 has been detected (YES in step S1313), the processing proceeds to step S1315. If the file close 309 has not been detected (NO in step S1313), the processing returns to step S1302.

In step S1315, the CPU 113 checks whether all the files registered in the transfer list 500 have been transferred. The transfer processing performed according to the transfer list 500 is as described in the first exemplary embodiment, and the description thereof will be omitted here. If all the files registered in the transfer list 500 have been transferred (YES in step S1315), the processing proceeds to step S1316.

In step S1316, the CPU 113 changes the timing of the file break that has been changed in step S1314, to the original timing. In the present exemplary embodiment, the setting for causing the file break 310 so that the file size becomes a size not exceeding 1 GB is changed back to the normal setting (for causing the file break 310 so that the file size becomes a size not exceeding 4 GB).

As described above, when a transfer instruction has been received during the recording of image data of a scene, a file at the time point when the transfer instruction has been received is brought into the completed state, and a new file for continuously recording the scene is generated, so that the file brought into the completed state is transferred. With this configuration, when a transfer instruction is issued during the recording of image data, the image data being recorded can be promptly transferred to an external device.

Fifth Exemplary Embodiment

In a fifth exemplary embodiment, a modified example of the fourth exemplary embodiment will be described. In the present exemplary embodiment, the description will be mainly given of a difference from the fourth exemplary embodiment, and the description of the same parts as those in the other exemplary embodiments will be omitted.

In FIG. 12B, if the file break 310 is triggered by the Transfer Req 401, the file_B#3 (307b (3)) at the time point when the transfer instruction has been received is brought into the completed state, and the new file_B#4 (307b (4)) for continuously recording the scene #2 is generated. Then, the file break 310 further occurs for the file_B#4 (307b (4)). The file_B#4 (307b (4)) is accordingly brought into the completed state, and the new file_B#5 (307b (5)) for continuously recording the scene #2 is generated.

At this time, in the fourth exemplary embodiment, after the file break 310 is triggered by the Transfer Req 401, the timing of the file break is changed.

In contrast, in the fifth exemplary embodiment, if the transfer of the file_B#3 (307b (3)) is completed during the recording of the file_B#4 (307b (4)), the file break 310 is caused. The file_B#4 (307b (4)) is accordingly brought into the completed state, and the new file_B#5 (307b (5)) for continuously recording the scene #2 is generated.

Figure 14A:
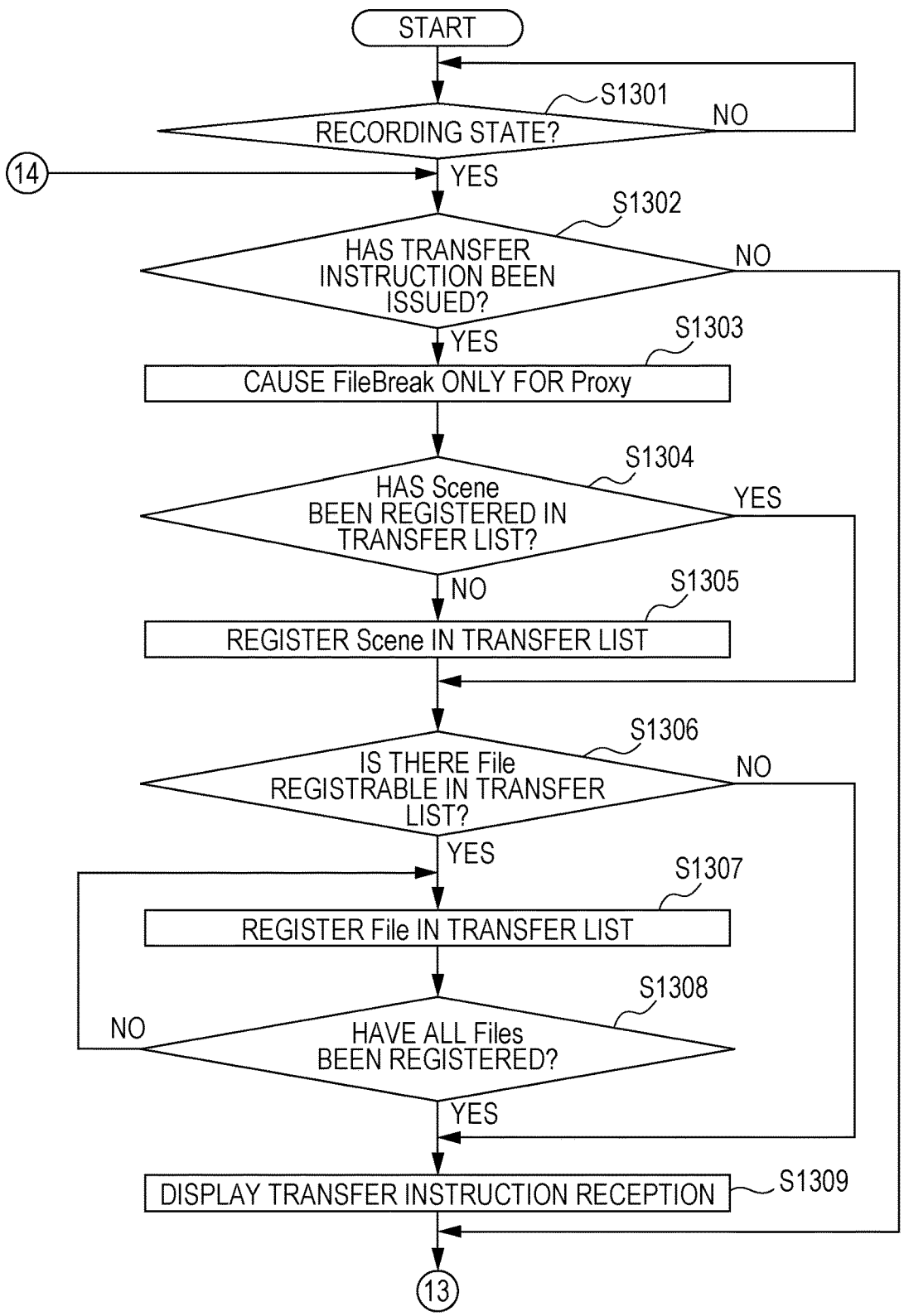
FIGS. 14A and 14B are flowcharts illustrating file generation control processing and transfer list registration processing of a video camera according to a fifth exemplary embodiment.
Figure 14B:
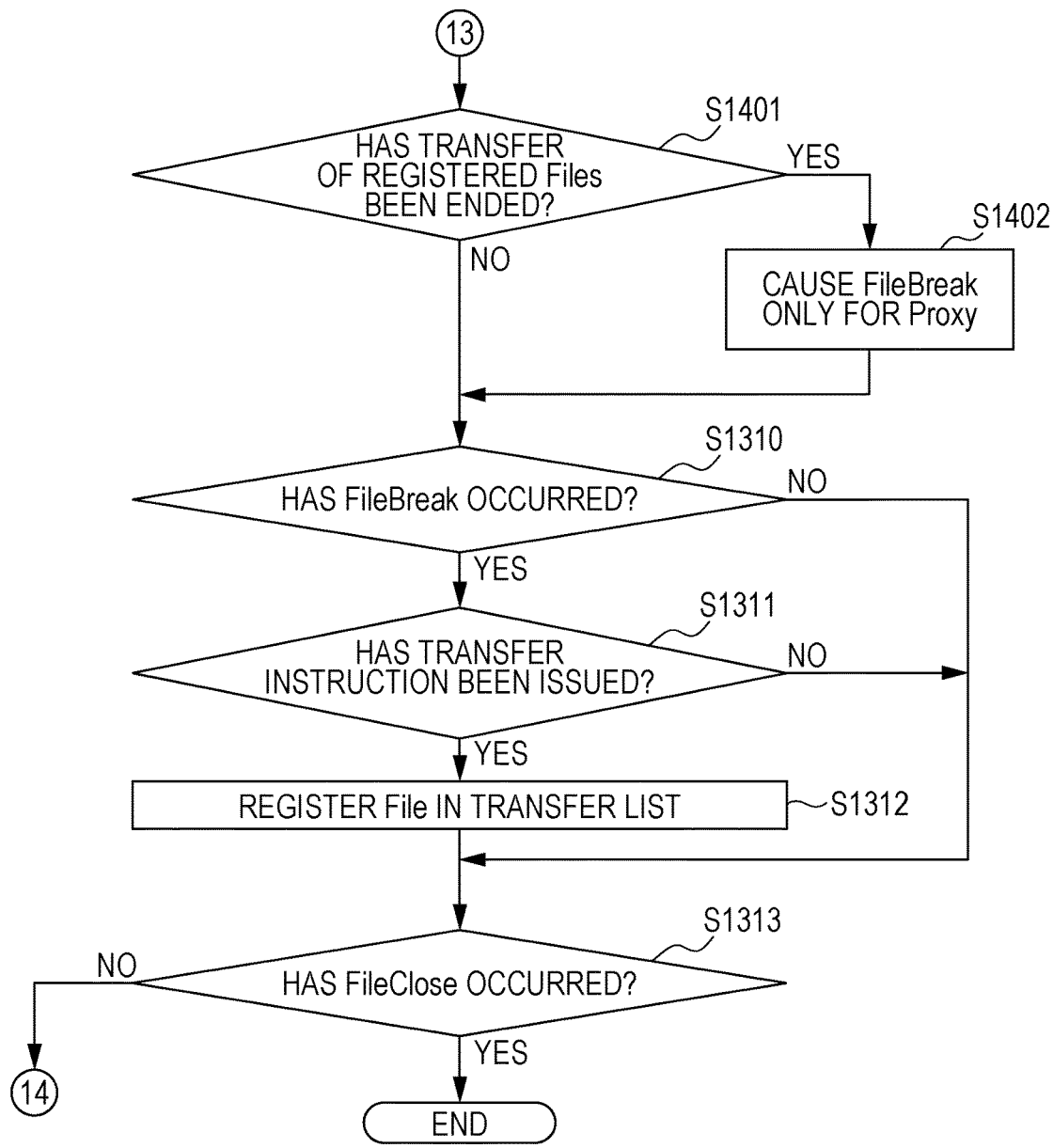

FIGS. 14A and 14B are flowcharts illustrating file generation control processing and transfer list registration processing of a video camera 100 according to the fifth exemplary embodiment. Steps similar to steps in FIGS. 13A and 13B that have been described in the fourth exemplary embodiment are assigned the same step numbers, and the description thereof will be omitted.

In step S1309, the CPU 113 notifies, using the display unit 112, the user that the registration in the transfer list 500 has been performed in response to the Transfer Req 401, and then in step S1401, the CPU 113 checks whether all the files registered in the transfer list 500 have been transferred. The transfer processing performed according to the transfer list 500 is as described in the first exemplary embodiment, and the description thereof will be omitted here. If all the files registered in the transfer list 500 have been transferred (YES in step S1401), the processing proceeds to step S1402.

In step S1402, the CPU 113 causes the file break 310 for the proxy recording performed on the recording medium B117. In response to this, in FIG. 12B, the file_B#4 (307b (4)) is brought into the completed state, and the new file_B#5 (307b (5)) for continuously recording the scene #2 is generated. In this manner, by actively closing the next file and bringing the file into the completed state when the transfer of a preceding file is completed, the next file can be made successively-transferable.

As described above, the present invention has been described together with the exemplary embodiments. The above-described exemplary embodiments merely indicate example embodiments for executing the present invention. The technical scope of the present invention is not to be construed in a limited manner by these exemplary embodiments. In other words, the present invention can be executed in various forms without departing from the technical idea or the major features thereof.

For example, in the fourth exemplary embodiment, the description has been given of the example in which high image quality video data is recorded on the recording medium A104, and video data with lower bit rate than that of the main recording is simultaneously recorded on the recording medium B117. The configuration is not limited to this example. For example, video data equivalent to the data recorded on the recording medium A104 may be recorded on the recording medium B117.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2015-158532, filed Aug. 10, 2015, and 2015-164980, filed Aug. 24, 2015, which are hereby incorporated by reference herein in their entirety.

What is claimed is:

1. An image recording apparatus that can communicate with an external apparatus, the image recording apparatus comprising:

a processor; and
a communication interface,
wherein the processor functions at least as a recording unit, a completion unit, a first input unit, and a transmission unit,
wherein the recording unit is configured to record movie data on at least one recording medium,
wherein the completion unit is configured to complete a movie file based on movie data recorded on the at least one recording medium by the recording unit,
wherein the first input unit is configured to receive a predetermined instruction for transmitting at least part of movie data, recorded by the recording unit, to the external apparatus,
wherein the transmission unit is configured to transmit, via the communication interface, at least one of movie files completed by the completion unit, based on the predetermined instruction, and
wherein, in a case in which the first input unit receives the predetermined instruction while the recording unit is recording the movie data, the completion unit completes a recorded part of the movie data being recorded, as a movie file, and the transmission unit automatically transmits the completed movie file via the communication interface.

2. The image recording apparatus of claim 1, wherein, in a case in which the first input unit receives the predetermined instruction while the recording unit is recording the movie data, the completion unit completes a recorded part of the movie data being recorded, as a movie file, and the recording unit continues to record the movie data.

3. The image recording apparatus of claim 2, wherein the processor further functions as a second input unit, which is configured to receive an instruction for starting or stopping recording performed by the recording unit, wherein, in a case in which the second input unit receives an instruction for stopping recording of the movie data of which recording has been continued, the completion unit completes a movie file based on the movie data of which recording has been stopped, and wherein the transmission unit transmits the movie file that is based on the movie data of which recording has been stopped.

4. The image recording apparatus of claim 1, wherein the recording unit records first movie data and second movie data on at least one recording medium based on a same movie, and wherein, in a case in which the first input unit receives the predetermined instruction while the recording unit is recording the first and second movie data, the completion unit completes a recorded part of the first movie data being recorded, as a movie file, and the transmission unit automatically transmits the completed movie file via the communication interface.

5. The image recording apparatus of claim 4, wherein, in a case in which the first input unit receives the predetermined instruction while the recording unit is recording the first and second movie data, the completion unit does not complete a recorded part of the second movie data being recorded, as a movie file.

6. The image recording apparatus of claim 4, wherein the first movie data is smaller in size than the second movie data.

7. The image recording apparatus of claim 4, wherein the first movie data and the second movie data are recorded on different recording media.

8. The image recording apparatus of claim 1, wherein, in a case in which the first input unit receives the predetermined instruction while the recording unit is not recording the movie data, the transmission unit automatically transmits, via the communication interface, a movie file recorded last among completed movie files.

9. The image recording apparatus of claim 1, further comprising an imaging unit configured to capture an image of a subject to obtain movie data.

10. The image recording apparatus of claim 1, further comprising a holding unit configured to hold a list for registering a movie file transmitted by the transmission unit.

11. A control method of an image recording apparatus that can communicate with an external apparatus, the control method comprising:

recording movie data on at least one recording medium;
completing a movie file based on movie data recorded on the at least one recording medium;
receiving a predetermined instruction for transmitting at least part of recorded movie data to the external apparatus; and
transmitting, via a communication interface, at least one of completed movie files, based on the predetermined instruction, wherein, in a case in which the predetermined instruction is received while the movie data is being recorded, completing includes completing a recorded part of the movie data being recorded, as a movie file, and transmitting includes automatically transmitting the completed movie file via the communication interface.

12. The control method of claim 11, wherein, in a case in which receiving includes receiving the predetermined instruction while the movie data is being recorded, completing includes completing a recorded part of the movie data being recorded, as a movie file, and recording includes continuing to record the movie data.

13. The control method of claim 12, further comprising receiving an instruction for starting or stopping recording, wherein, in a case in which receiving the instruction includes receiving an instruction for stopping recording of the movie data of which recording has been continued, completing includes completing a movie file based on the movie data of which recording has been stopped, and wherein transmitting includes transmitting the movie file that is based on the movie data of which recording has been stopped.

14. The control method of claim 11, wherein recording includes recording first movie data and second movie data on at least one recording medium based on a same movie, and wherein, in a case in which receiving the predetermined instruction includes receiving the predetermined instruction while the first and second movie data is being recorded, completing includes completing a recorded part of the first movie data being recorded, as a movie file, and transmitting includes automatically transmitting the completed movie file via the communication interface.

15. The control method of claim 14, wherein, in a case in which receiving the predetermined instruction includes receiving the predetermined instruction while the first and second movie data is being recorded, completing includes not completing a recorded part of the second movie data being recorded, as a movie file.

16. A non-transitory computer readable recording medium storing a program to cause a computer to perform a control method of an image recording apparatus that can communicate with an external apparatus, the control method comprising:

recording movie data on at least one recording medium;
completing a movie file based on movie data recorded on the at least one recording medium;
receiving a predetermined instruction for transmitting at least part of recorded movie data to the external apparatus; and
transmitting, via a communication interface, at least one of completed movie files, based on the predetermined instruction, wherein, in a case in which the predetermined instruction is received while the movie data is being recorded, completing includes completing a recorded part of the movie data being recorded, as a movie file, and transmitting includes automatically transmitting the completed movie file via the communication interface.

17. The non-transitory computer readable recording medium of claim 16, wherein, in a case in which receiving includes receiving the predetermined instruction while the movie data is being recorded, completing includes completing a recorded part of the movie data being recorded, as a movie file, and recording includes continuing to record the movie data.

18. The non-transitory computer readable recording medium of claim 17, the control method further comprising receiving an instruction for starting or stopping recording, wherein, in a case in which receiving the instruction includes receiving an instruction for stopping recording of the movie data of which recording has been continued, completing includes completing a movie file based on the movie data of which recording has been stopped, and wherein transmitting includes transmitting the movie file that is based on the movie data of which recording has been stopped.

19. The non-transitory computer readable recording medium of claim 17, wherein recording includes recording first movie data and second movie data on at least one recording medium based on a same movie, and wherein, in a case in which receiving the predetermined instruction includes receiving the predetermined instruction while the first and second movie data is being recorded, completing includes completing a recorded part of the first movie data being recorded, as a movie file, and transmitting includes automatically transmitting the completed movie file via the communication interface.

20. The non-transitory computer readable recording medium of claim 19, wherein, in a case in which receiving the predetermined instruction includes receiving the predetermined instruction while the first and second movie data is being recorded, completing includes not completing a recorded part of the second movie data being recorded, as a movie file.

* * * * *